(12) United States Patent
Mori et al.

(10) Patent No.: US 9,987,582 B2
(45) Date of Patent: Jun. 5, 2018

(54) PLUGGED HONEYCOMB STRUCTURE AND PLUGGED HONEYCOMB SEGMENT

(71) Applicant: NGK INSULATORS, LTD., Nagoya (JP)

(72) Inventors: Kazuya Mori, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 106 days.

(21) Appl. No.: 15/245,587

(22) Filed: Aug. 24, 2016

(65) Prior Publication Data

US 2017/0056804 A1 Mar. 2, 2017

(30) Foreign Application Priority Data

Sep. 2, 2015 (JP) .................................. 2015-172704

(51) Int. Cl.
| | |
|---|---|
| *B01D 50/00* | (2006.01) |
| *B01D 39/14* | (2006.01) |
| *B01D 39/06* | (2006.01) |
| *B01D 39/20* | (2006.01) |
| *B01D 46/24* | (2006.01) |

(52) U.S. Cl.
CPC ....... *B01D 46/2455* (2013.01); *B01D 46/247* (2013.01); *B01D 46/2459* (2013.01); *B01D 46/2462* (2013.01); *B01D 46/2466* (2013.01); *B01D 46/2474* (2013.01); *B01D 2046/2481* (2013.01); *B01D 2046/2485* (2013.01)

(58) Field of Classification Search
None
See application file for complete search history.

(56) References Cited

U.S. PATENT DOCUMENTS

| | | | | |
|---|---|---|---|---|
| 7,537,633 B2* | 5/2009 | Bardon | .............. | B01D 46/2429 |
| | | | | 428/116 |
| 7,556,782 B2* | 7/2009 | Ohno | .................. | B01D 46/0063 |
| | | | | 422/180 |
| 9,080,484 B2* | 7/2015 | Miyairi | .................... | F01N 3/035 |
| D763,427 S | 8/2016 | Miyairi | | |
| 9,650,928 B2* | 5/2017 | Shibata | ................. | F01N 3/0222 |
| 2005/0076627 A1* | 4/2005 | Itou | ..................... | B01D 39/2068 |
| | | | | 55/523 |
| 2014/0298779 A1 | 10/2014 | Miyairi | | |
| 2015/0037532 A1 | 2/2015 | Shibata et al. | | |

FOREIGN PATENT DOCUMENTS

| | | | |
|---|---|---|---|
| JP | 2014-200741 A1 | 10/2014 | |
| JP | 2015-029939 A1 | 2/2015 | |

* cited by examiner

*Primary Examiner* — Amber R Orlando
(74) *Attorney, Agent, or Firm* — Burr & Brown, PLLC

(57) ABSTRACT

A plugged honeycomb structure includes: a plurality of honeycomb segments, a bonding layer, and plugging portions to plug open ends of cells of the honeycomb segment. Each honeycomb segment is configured so that the cells having at least two types of different shapes have a predetermined repeated sequence pattern. A circumferential-wall partially surrounded cell in which a partition wall and a segment circumferential wall are disposed so as to surround the cell has an area of open end that has a specific ratio to an area of open end of a partition-wall entirely surrounded cell including the cross-sectional shape of the circumferential-wall partially surrounded cell. The repeated sequence pattern of the cells is kept at a boundary between two of the honeycomb segments bonded with the bonding layer at an inflow end face and an outflow end face.

14 Claims, 14 Drawing Sheets

PLUGGED HONEYCOMB STRUCTURE AND PLUGGED HONEYCOMB SEGMENT

The present application is an application based on JP 2015-172704 filed on Sep. 2, 2015 with Japan Patent Office, the entire contents of which are incorporated herein by reference.

BACKGROUND OF THE INVENTION

Field of the Invention

The present invention relates to a plugged honeycomb structure and a plugged honeycomb segment. More particularly the present invention relates to a plugged honeycomb structure and a plugged honeycomb segment with low pressure loss and excellent thermal shock resistance.

Description of the Related Art

In recent years, there has been a demand for the reduction in fuel consumption of an automobile from the viewpoints of influences on the global environment and resource saving. This leads to a tendency of using internal combustion engines with good thermal efficiency, such as a direct injection type gasoline engine and a diesel engine, as a power source for an automobile.

Meanwhile, these internal combustion engines have a problem that soot is generated during combustion of the fuel. A countermeasure has been then required from the viewpoint of air environment to remove toxic components included in exhaust gas and to avoid the emission of particulate matter (hereinafter this may be called "PM"), such as soot or ash, to the air.

Especially there is a global tendency of tightening the regulations on removal of PM emitted from a diesel engine. Then a honeycomb-structured wall flow type exhaust gas purification filter has attracted the attention as a trapping filter (this may be called a "DPF") to remove PM, and various systems for the filter have been proposed. Such a DPF is typically configured so that a plurality of cells serving as a through channel of fluid is defined by a porous partition wall, and by plugging the cells alternately, the porous partition wall defining the cells functions as a filter. A pillar-shaped structure including a plurality of cells defined by a porous partition wall may be called a "honeycomb structure". Then a honeycomb structure including cells whose open ends are plugged with plugging portions may be called a "plugged honeycomb structure". A plugged honeycomb structure is widely used as a trapping filter, such as a DPF. As exhaust gas containing particulate matter flows into the plugged honeycomb structure from the inflow end face (first end face), the particulate matter in the exhaust gas is filtered during the passing through the partition wall, and the purified gas is emitted from the outflow end face (second end face) of the plugged honeycomb structure.

Conventionally a plugged honeycomb structure includes the cells, such as quadrangular cells, hexagonal cells, and HAC cells (cells having the geometry that is the combination of octagons and quadrangles). Recently new plugged honeycomb structures have been developed, including the combination of cells of different shapes or having a feature in the position of plugging (see Patent Documents 1 and 2). Such plugged honeycomb structures can suppress cracks during burning of PM and can accumulate a lot of ash at the partition wall while reducing both of the pressure loss during the initial stage of the operation and the pressure loss after PM is accumulated.

[Patent Document 1] JP-A-2014-200741
[Patent Document 2] JP-A-2015-029939

SUMMARY OF THE INVENTION

When a plugged honeycomb structure having a unique shape of cells as in Patent Documents 1 and 2 is provided as a DPF in an internal combustion engine of an automobile or the like, such a plugged honeycomb structure typically is prepared to have a round pillar shape of a certain size. The following manufacturing method is proposed as one of the methods to manufacture a round pillar-shaped plugged honeycomb structure. Firstly, a plurality of honeycomb segments is prepared, each having a partition wall to define cells of a unique shape and a segment circumferential wall to surround the circumference of the cells. Next, the plurality of honeycomb segments is bonded with a bonding material to prepare a bonded member of the honeycomb segments (hereinafter called a "honeycomb-segment bonded member"). Next, the circumference of the honeycomb-segment bonded member is ground to have any shape, around which coating is performed, so as to manufacture a plugged honeycomb structure. Hereinafter a plugged honeycomb structure manufactured by such a method may be called a "segment-structured plugged honeycomb structure".

Conventionally the "sequence of cells (in other words, continuity of the repeating unit of cells)" among the honeycomb segments of a honeycomb-segment bonded member has not been seen as a problem especially for a segment-structured plugged honeycomb structure. For instance, in the case of all of the cells of a plugged honeycomb structure having the same quadrangular shape, the minimum repeating unit of the cells is one cell. Therefore, the "sequence of cells" among the honeycomb segments is not seen as a problem especially in such a plugged honeycomb structure. Even if the "sequence of cells" is irregular, influences from such irregularity on the properties of the plugged honeycomb structure have been considered small. However, in the case of a plugged honeycomb structure having a unique shape of cells as in Patent Documents 1 and 2, it was found that the "sequence of cells" among the honeycomb segments greatly influences the properties of the plugged honeycomb structure. That is, in the plugged honeycomb structure having a unique shape of cells as in Patent Documents 1 and 2, the "repeating units of the cells" made up of a plurality of cells have a sequence based on certain continuity. Therefore if the "continuity of the repeating unit of cells" becomes irregular among the honeycomb segment of such a plugged honeycomb structure, the pressure loss during the initial stage of the operation and the pressure loss after PM accumulation relatively increase.

In view of such problems of the conventional techniques, the present invention provides a plugged honeycomb structure with low pressure loss as well as excellent thermal shock resistance, and such a plugged honeycomb segment.

The present invention provides the following plugged honeycomb structure and plugged honeycomb segment.

[1] A plugged honeycomb structure, includes:
a plurality of prismatic-columnar shaped honeycomb segments, each having a porous partition wall that defines a plurality of cells extending from an inflow end face through which fluid flows in to an outflow end face through which the fluid flows out, and a segment circumferential wall disposed at outermost circumference of the honeycomb segment;
a bonding layer to bond lateral faces of the plurality of honeycomb segments; and
a plugging portion disposed at open ends of predetermined cells at the inflow end face of each of the honeycomb segments and at open ends of residual cells at the outflow end face of the honeycomb segment, wherein
the honeycomb segment is configured so that the cells having at least two types of different shapes have a predetermined repeated sequence pattern in a cross section orthogonal to an extending direction of the cells, the cells of each honeycomb segment include: a partition-wall entirely surrounded cell in which the partition wall is disposed so as to surround the cell, and a circumferential-wall partially surrounded cell whose shape in the cross section orthogonal to the extending direction of the cells includes at least a part of the shape of the partition-wall entirely surrounded cell, in which the partition wall and the segment circumferential wall are disposed so as to surround the cell, the circumferential-wall partially surrounded cell having an area of open end that is smaller than an area of open end of the partition-wan entirely surrounded cell including the shape of the circumferential-wall partially surrounded cell, the circumferential-wall partially surrounded cell includes a one-side circumferential wall cell, in which one side of a shape of the one-side circumferential wall cell in the cross section is made up of the segment circumferential wall, and an area of open end of the one-side circumferential wall cell is 45 to 55% of an area of open end of the partition-wall entirely surrounded cell including the shape of the one-side circumferential wall cell, the circumferential-wall partially surrounded cell does not include a two-side circumferential wall cell in each of the honeycomb segments, in which two sides of a shape of the two-side circumferential wall cell in the cross section are made up of the segment circumferential wall, or an area of open end of the two-side circumferential wall cell is 20 to 30% of an area of open end of the partition-wall entirely surrounded cell including the shape of the two-side circumferential wall cell, and the repeated sequence pattern of the cells is kept at a boundary between two of the honeycomb segments bonded with the bonding layer at the inflow end face and the outflow end face.

[2] The plugged honeycomb structure according to [1], wherein the plugging portion is disposed at open ends of the cells of the honeycomb segment so that inflow cells in which the plugging portion is disposed at open ends of the cells at the outflow end face surround one outflow cell in which the plugging portion is disposed at open ends of the cell at the inflow end face except for at a circumferential region.

[3] The plugged honeycomb structure according to [1] or [2], wherein the segment circumferential wall of the honeycomb segment has a thickness of 0.3 to 1.0 mm.

[4] The plugged honeycomb structure according to any one of [1] to [3], wherein the bonding layer has a thickness of 0.5 to 1.5 mm.

[5] The plugged honeycomb structure according to any one of [1] to [4], wherein the partition-wall entirely surrounded cell includes two types or more of cells that are different in shape in the cross section.

[6] A plugged honeycomb segment, includes:

a prismatic-columnar shaped honeycomb segment having a porous partition wall that defines a plurality of cells extending from an inflow end face through which fluid flows in to an outflow end face through which the fluid flows out, and a segment circumferential wall disposed at outermost circumference of the honeycomb segment; and a plugging portion disposed at open ends of predetermined cells at the inflow end face of the honeycomb segment and at open ends of residual cells at the outflow end face of the honeycomb segment, wherein the honeycomb segment is configured so that the cells having at least two types of different shapes have a predetermined repeated sequence pattern in a cross section orthogonal to an extending direction of the cells, the cells of the honeycomb segment include: a partition-wall entirely surrounded cell in which the partition wall is disposed so as to surround the cell, and a circumferential-wall partially surrounded cell whose shape in the cross section orthogonal to the extending direction of the cells includes at least a part of the shape of the partition-wall entirely surrounded cell, in which the partition wall and the segment circumferential wall are disposed so as to surround the cell, the circumferential-wall partially surrounded cell having an area of open end that is smaller than an area of open end of the partition-wall entirely surrounded cell including the shape of the circumferential-wall partially surrounded cell, the circumferential-wall partially surrounded cell includes a one-side circumferential wall cell, in which one side of a shape of the one-side circumferential wall cell in the cross section is made up of the segment circumferential wall, and an area of open end of the one-side circumferential wall cell is 45 to 55% of an area of open end of the partition-wall entirely surrounded cell including the shape of the one-side circumferential wall cell, and the circumferential-wall partially surrounded cell does not include a two-side circumferential wall cell in the honeycomb segment, in which two sides of a shape of the two-side circumferential wall cell in the cross section are made up of the segment circumferential wall, or an area of open end of the two-side circumferential wall cell is 20 to 30% of an area of open end of the partition-wall entirely surrounded cell including the shape of the two-side circumferential wall cell.

[7] The plugged honeycomb segment according to [6], wherein the plugging portion is disposed at open ends of the cells of the honeycomb segment so that inflow cells in which the plugging portion is disposed at open ends of the cells at the outflow end face surround one outflow cell in which the plugging portion is disposed at open ends of the cell at the inflow end face except for at a circumferential region.

[8] The plugged honeycomb segment according to [6] or [7], wherein the segment circumferential wall of the honeycomb segment has a thickness of 0.3 to 1.0 mm.

[9] The plugged honeycomb segment according to any one of [6] to [8], wherein the partition-wall entirely surrounded cell includes two types or more of cells that are different in shape in the cross section.

A plugged honeycomb structure of the present invention is a so-called segment-structured plugged honeycomb structure, in which the repeated sequence pattern of the cells is kept at a boundary between two of the honeycomb segments bonded with the bonding layer at the inflow end face and the outflow end face. The plugged honeycomb structure of the present invention can be used favorably as a trapping filter to remove particulate matter included in exhaust gas, and this plugged honeycomb structure has low pressure loss and excellent thermal shock resistance.

A plugged honeycomb segment of the present invention is to produce a plugged honeycomb structure of the present invention. A plurality of the plugged honeycomb segments of the present invention is used and the lateral faces of these plugged honeycomb segments are bonded with the bonding layer, whereby a plugged honeycomb structure with low pressure loss and excellent thermal shock resistance can be manufactured very simply.

DESCRIPTION OF THE PREFERRED EMBODIMENTS

Figure 1:
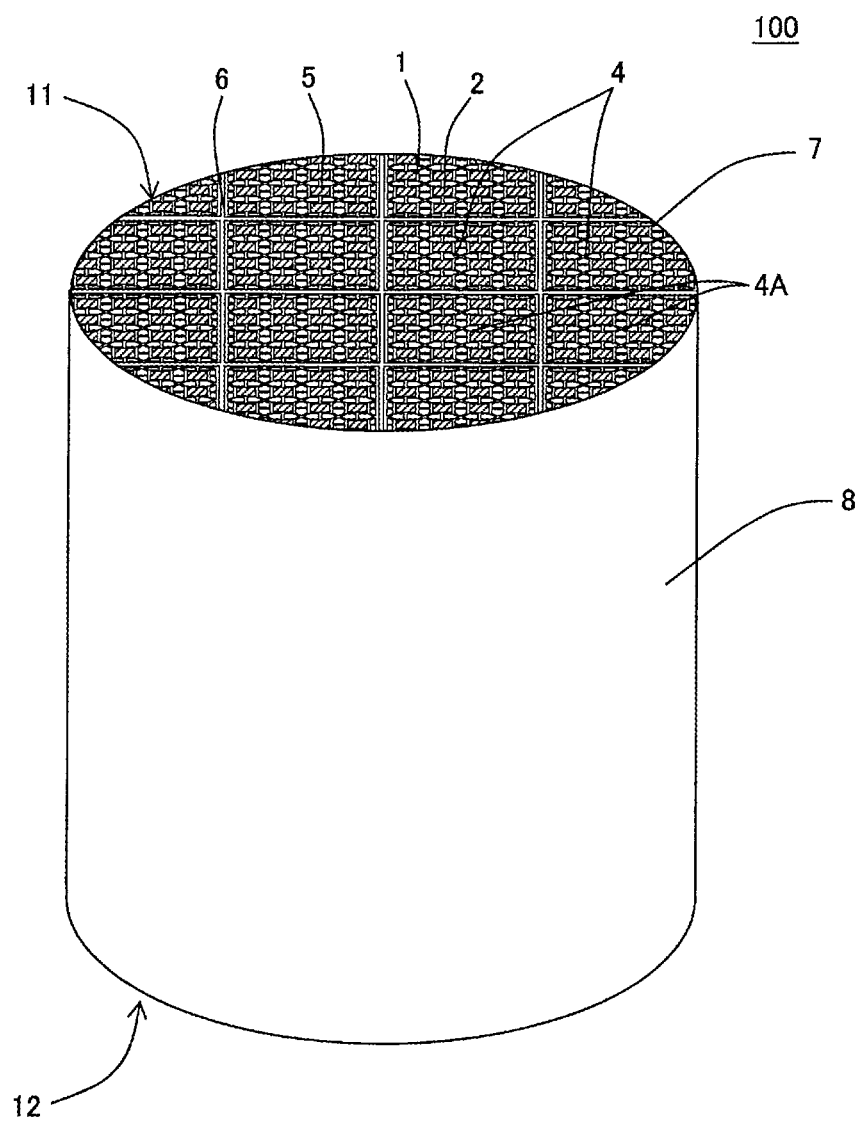
FIG. 1 is a schematic perspective view of a plugged honeycomb structure that is a first embodiment of the present invention viewed from its inflow end face.

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

(1) Plugged Honeycomb Structure:

As shown in FIGS. 1 to 5, a plugged honeycomb structure that is a first embodiment of the present invention is a plugged honeycomb structure 100 that includes a plurality of honeycomb segments 4, a bonding layer 6, and plugging portions 5. That is, the plugged honeycomb structure 100 according to the present embodiment is a so-called segment-structured plugged honeycomb structure. The plugged honeycomb structure 100 further includes an outer wall 8 at the circumference so as to surround the plurality of honeycomb segments 4.

Figure 2:
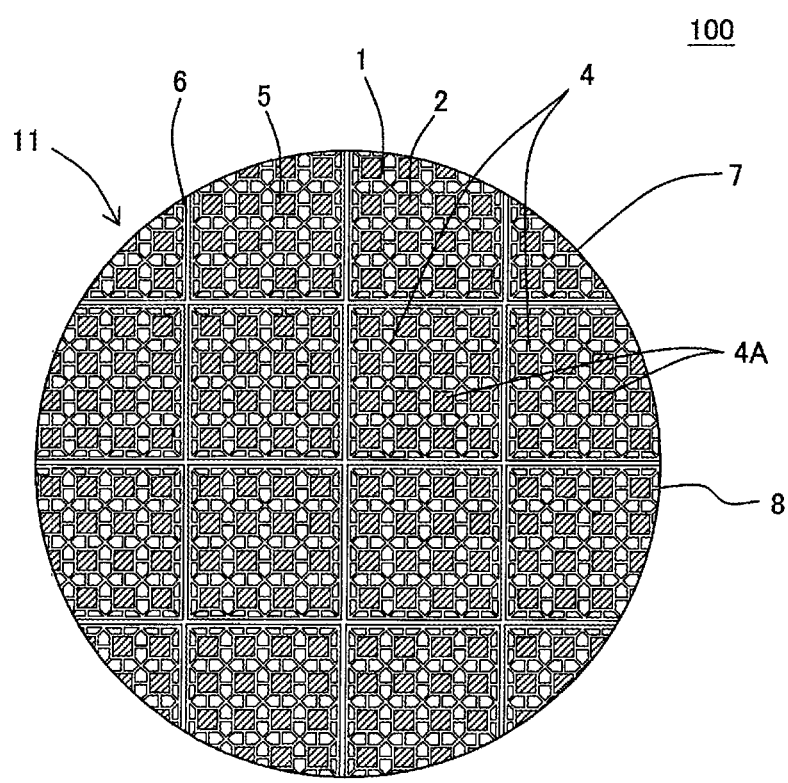
FIG. 2 is a schematic plan view of the plugged honeycomb structure that is the first embodiment of the present invention viewed from its inflow end face.
Figure 3:
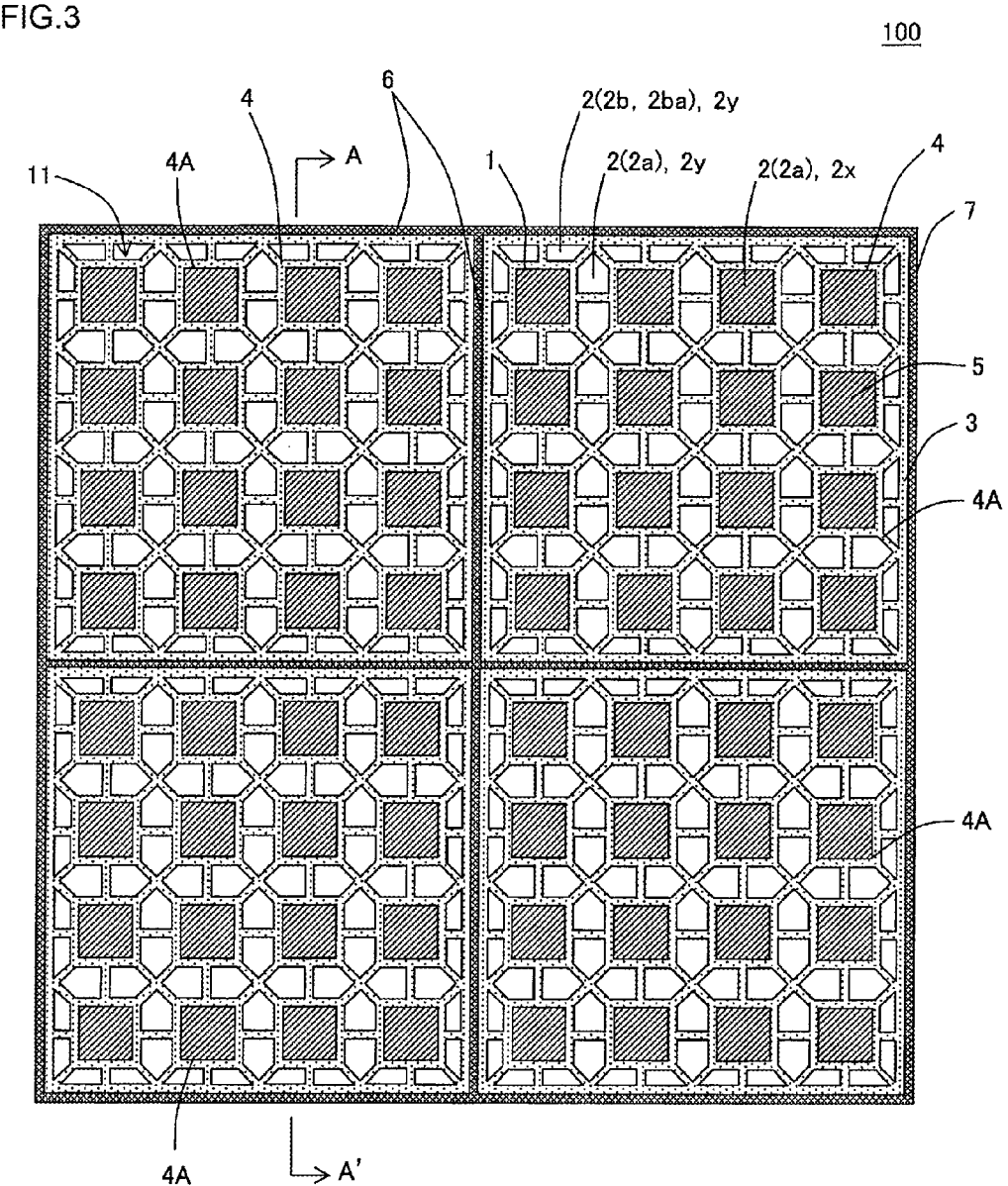
FIG. 3 is an enlarged plan view of a part of the inflow end face of the plugged honeycomb structure shown in FIG. 2.
Figure 4:
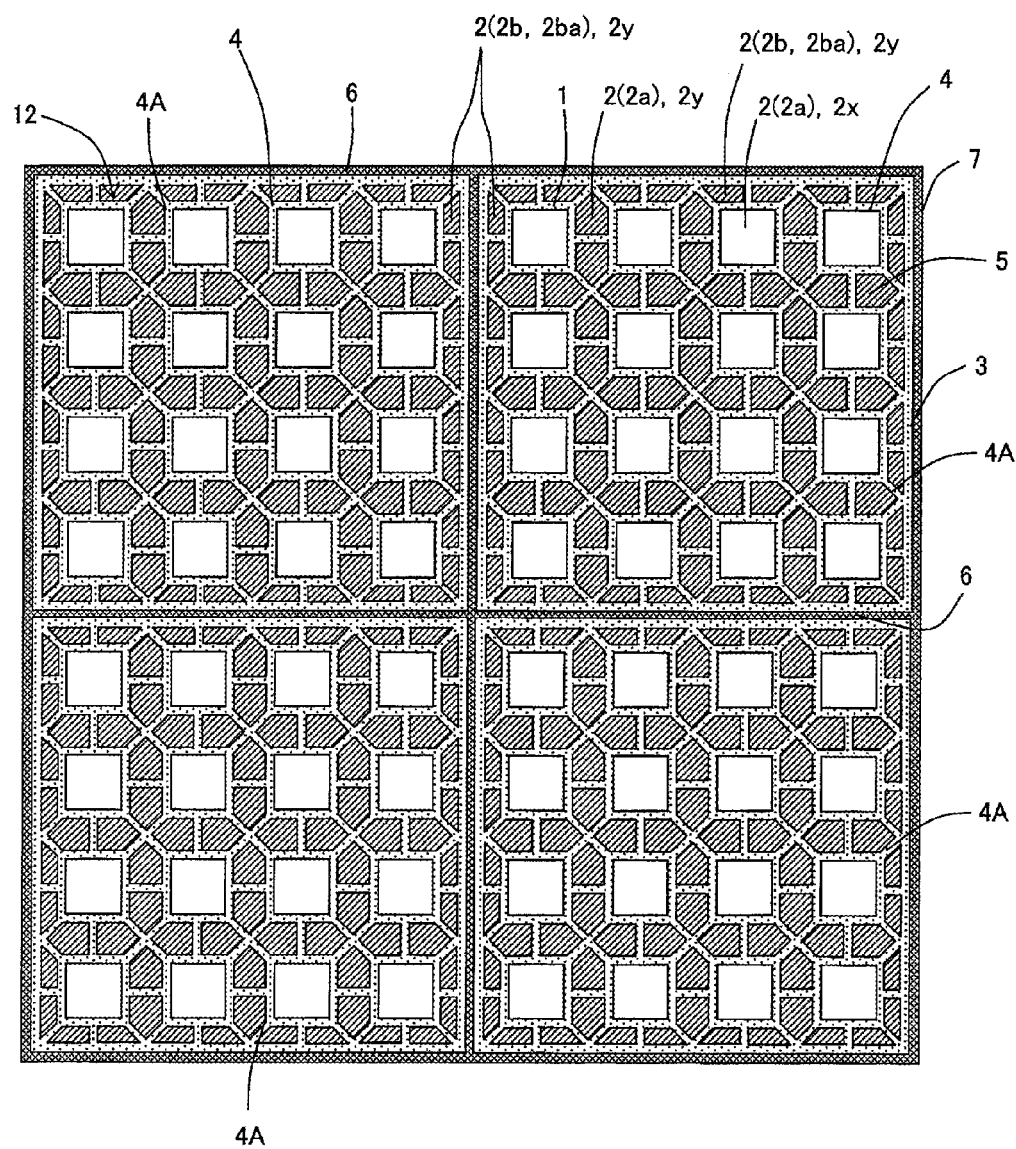
FIG. 4 is an enlarged plan view of a part of the outflow end face of the plugged honeycomb structure shown in FIG. 2.
Figure 5:
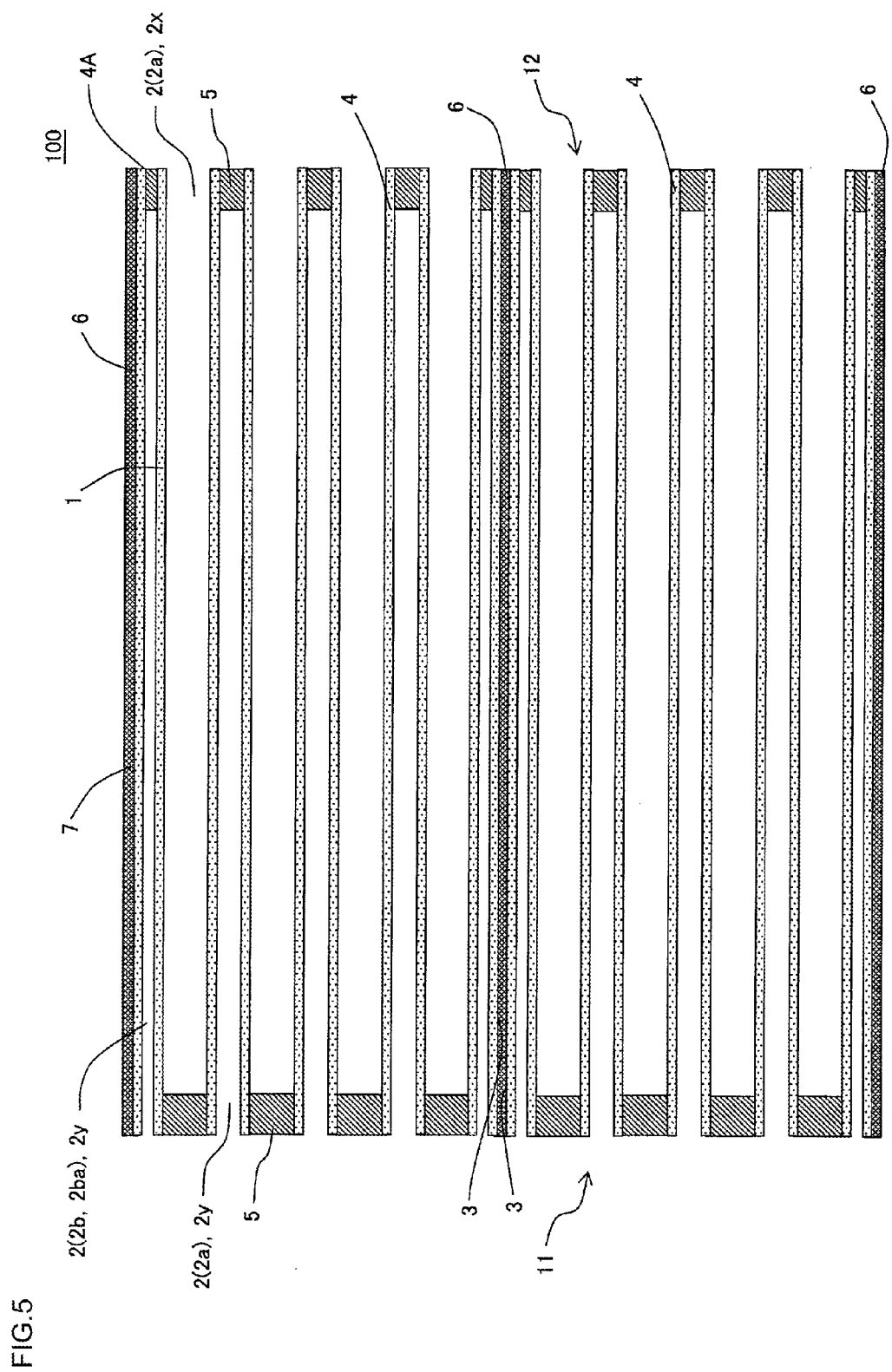
FIG. 5 is a cross-sectional view taken along A-A' of FIG. 3.
Figure 6:
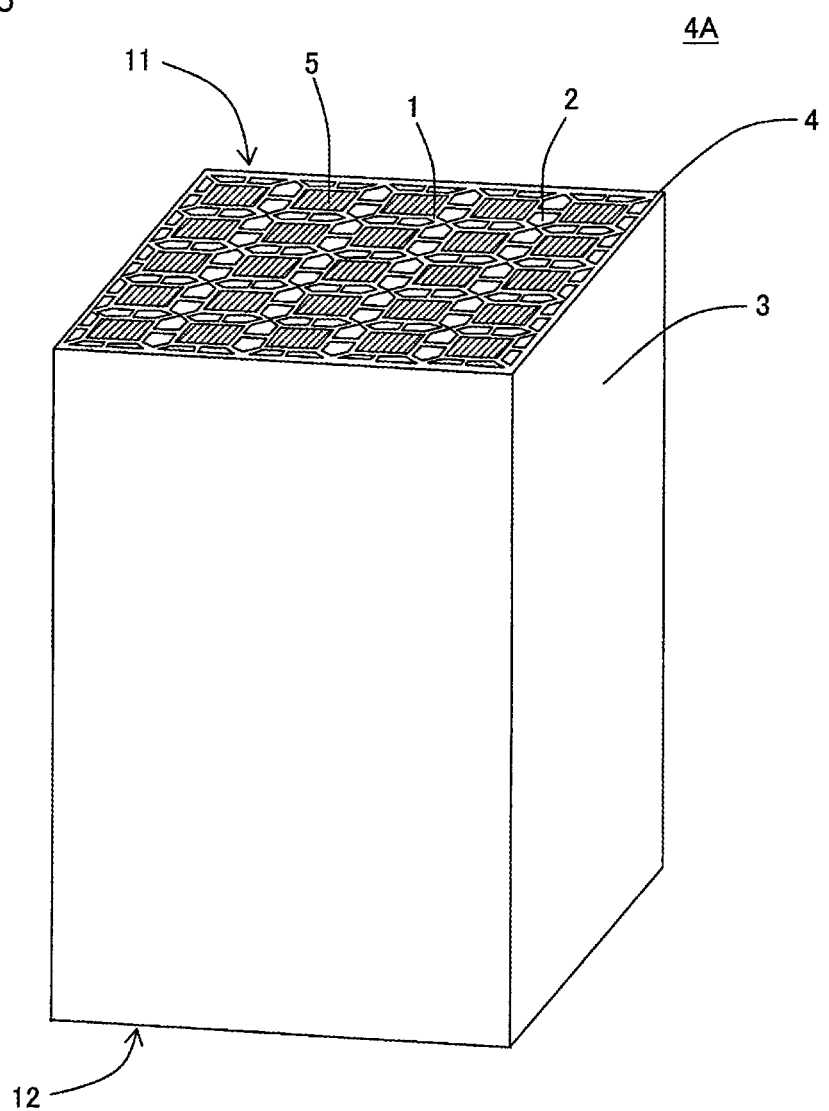
FIG. 6 is a schematic perspective view of a plugged honeycomb segment included in the plugged honeycomb structure shown in FIG. 1 viewed from the inflow end face.
Figure 7:
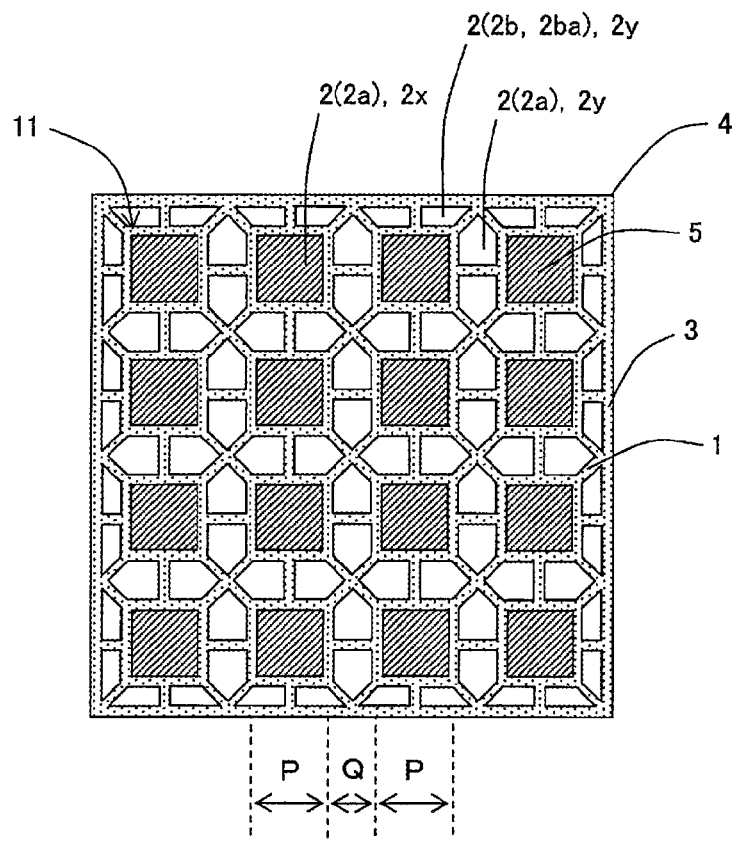
FIG. 7 is a schematic plan view of the plugged honeycomb segment included in the plugged honeycomb structure shown in FIG. 1 viewed from the inflow end face.

Herein, FIG. 1 is a schematic perspective view of the plugged honeycomb structure that is the first embodiment of the present invention viewed from its inflow end face. FIG. 2 is a schematic plan view of the plugged honeycomb structure that is the first embodiment of the present invention viewed from its inflow end face. FIG. 3 is an enlarged plan view of a part of the inflow end face of the plugged honeycomb structure shown in FIG. 2. FIG. 4 is an enlarged plan view of a part of the outflow end face of the plugged honeycomb structure shown in FIG. 2. FIG. 5 is a cross-sectional view taken along A-A' of FIG. 3. FIG. 6 is a schematic perspective view of a plugged honeycomb segment included in the plugged honeycomb structure shown in FIG. 1 viewed from the inflow end face. FIG. 7 is a schematic plan view of the plugged honeycomb segment included in the plugged honeycomb structure shown in FIG. 1 viewed from the inflow end face.

As shown in FIGS. 6 and 7, a honeycomb segment 4 includes a porous partition wall 1 that defines a plurality of cells 2 extending from an inflow end face 11 through which fluid flows in, to an outflow end face 12 through which the fluid flows out, and a segment circumferential wall 3 disposed at the outermost circumference. As shown in FIGS. 1 to 5, the plugged honeycomb structure 100 of the present embodiment includes a plurality of the honeycomb segments 4, and the plurality of honeycomb segments 4 are bonded at their lateral faces via the bonding layer 6. In the plugged honeycomb structure 100 of the present embodiment, honeycomb segments 4 among the plurality of honeycomb segments 4 that are disposed at a center part of the plugged honeycomb structure 100 and are not in contact with the outer wall 8, have a prismatic columnar shape, where the direction from the inflow end face 11 to the outflow end face 12 is the axial direction of the prismatic columnar shape. Honeycomb segments 4 among the plurality of honeycomb segments 4 that are disposed at the circumferential part and are in contact with the outer wall 8 have a pillar shape, in which a part of the prismatic columnar honeycomb segment 4 is ground to follow the shape of the outer wall 8.

The bonding layer 6 is made of a bonding material to bond the lateral faces of the plurality of honeycomb segments 4.

A bonded member obtained by bonding the plurality of honeycomb segments 4 via the bonding layer 6 may be called a honeycomb-segment bonded member 7.

The plugging portions 5 are disposed at the open ends of the cells 2 formed in each of the honeycomb segments 4 so as to plug the open ends of the cells 2 on any one of the inflow end face 11 side and the outflow end face 12 side. That is, the plugging portions 5 are disposed at the open ends of predetermined cells $2x$ at the inflow end face 11 of each of the honeycomb segments 4 and at the open ends of residual cells $2y$ other than the predetermined cells $2x$ at the outflow end face 12 of the honeycomb segment. Hereinafter a cell 2 with the plugging portion 5 disposed at the open end thereof on the inflow end face 11 of the honeycomb segment 4 (i.e., the predetermined cell $2x$ as stated above) may be called an "outflow cell $2x$". Then a cell 2 with the plugging portion 5 disposed at the open end thereof on the outflow end face 12 of the honeycomb segment 4 (i.e., the residual cell $2y$ as stated above) may be called an "inflow cell $2y$". A honeycomb segment 4 with the plugging portions 5 disposed at the open ends of the cells 2 may be called a plugged honeycomb segment 4A.

The honeycomb segment 4 is configured so that cells having at least two types of different shapes have a predetermined repeated sequence pattern in a cross section orthogonal to the extending direction of the cells 2. For instance, the honeycomb segment 4 shown in FIGS. 6 and 7 includes cells 2 of two types of different shapes, including quadrangular cells 2 (e.g., outflow cells $2x$) and pentagonal cells 2 (e.g., inflow cells $2y$). The "repeated sequence pattern" as stated above refers to a sequence pattern including at least one outflow cell $2x$ and at least one inflow cell $2y$, in which two or more of such sequence patterns are present in one honeycomb segment 4. Hereinafter the shape of the cells 2 in a cross section orthogonal to the extending direction of the cells 2 may be called a "cell shape", a "cross-sectional shape" and a "shape of a cross section".

The geometry of the plugging portions 5, i.e., the geometry of the outflow cells $2x$ and the inflow cells $2y$ is not limited especially. However, the plugging portions 5 are configured preferably at the open ends of the cells 2 of the honeycomb segment 4 so that inflow cells $2y$ surround an outflow cell $2x$ except for at the circumferential region of the honeycomb segment 4. For instance, in the honeycomb segment 4 shown in FIGS. 6 and 7, the plugging portions 5 are preferably configured so that inflow cells $2y$ that are pentagonal cells 2 surround an outflow cell $2x$ that is a quadrangular cell 2. Herein the "inflow cells $2y$ surround an outflow cell $2x$" refers to the following configuration in a cross section orthogonal to the extending direction of the cells 2. The following describes an example where the outflow cells $2x$ are quadrangular as in FIGS. 6 and 7. Firstly one side of an inflow cell $2y$ is adjacent to each of the four sides of one outflow cell $2x$. In this case, one side of each of two or more inflow cells $2y$ may be adjacent to one side of one outflow cell $2x$. That is, one side of one of the inflow cells $2y$ may be adjacent to one side of the one outflow cell $2x$ at the position of a half of the one side, and then one side of another inflow cell $2y$ may be adjacent to the one side of the one outflow cell $2x$ at the position of the remaining half of the one side. Then all of the inflow cells $2y$ adjacent to the one outflow cell $2x$ are disposed so that these inflow cells $2y$ are adjacent to each other at their mutual one sides. The geometry of the inflow cells $2y$ in such a state refers to the "inflow cells $2y$ surround an outflow cell $2x$". The "circumferential region of the honeycomb segment 4" refers to a region where "a circumferential-wall partially surrounded cell $2b$" described later is formed. That is, the "circumferential region of the honeycomb segment 4" refers to a region where cells 2 (circumferential-wall partially surrounded cells $2b$) that are defined by the partition wall 1 and the segment circumferential wall 3 are formed.

Among the cells 2 of each of the honeycomb segments 4, a cell 2 at which the partition wall 1 is disposed so as to surround the cell 2 is called a partition-wall entirely surrounded cell $2a$. Then, among the cells 2 of each of the honeycomb segments 4, a cell 2 having the following configuration is called a circumferential-wall partially surrounded cell $2b$. The circumferential-wall partially surrounded cell $2b$ has at least a part of the shape of the partition-wall entirely surrounded cell $2a$ in a cross section orthogonal to the extending direction of the cells 2. Then such a circumferential-wall partially surrounded cell $2b$ is configured so that the partition wall 1 and the segment circumferential wall 3 are disposed so as to surround the cell 2, and has an area of the open end that is smaller than that of the partition-wall entirely surrounded cell $2a$ including the shape of the cell 2. For instance, in the honeycomb segment 4 shown in FIGS. 6 and 7, all of the outflow cells $2x$ that are quadrangular in shape are the partition-wall entirely surrounded cells $2a$. Meanwhile among the inflow cells $2y$ disposed so as to surround the outflow cells $2x$, inflow cells $2y$ defined by the partition wall 1 only (i.e., surrounded with the partition wall 1) are the partition-wall entirely surrounded cells $2a$. Then, among the inflow cells $2y$, inflow cells $2y$ defined by the partition wall 1 and the segment circumferential wall 3 (i.e., surrounded with the partition wall 1 and the segment circumferential wall 3) are the circumferential-wall partially surrounded cells $2b$. As in another embodiment described later, some of the outflow cells $2x$ may be the circumferential-wall partially surrounded cells $2b$ depending on the shape of the cells 2 in the honeycomb segment 4. In another case, all of the inflow cells $2y$ are the partition-wall entirely surrounded cells $2a$. In the present invention, a circumferential-wall partially surrounded cell $2b$ is specified as a cell having a smaller area of the open end than that of the partition-wall entirely surrounded cell $2a$ including the shape of the circumferential-wall partially surrounded cell $2b$. This means that a cell 2 defined by the partition wall 1 and the segment circumferential wall 3 that has the same shape as that of the partition-wall entirely surrounded cell $2a$ including the shape of the cell 2 and has the same area of the open end is not a circumferential-wall partially surrounded cell $2b$. Therefore conditions for the circumferential-wall partially surrounded cell $2b$ described later do not apply to such a cell 2 defined by the partition wall 1 and the segment circumferential wall 3 that has the same shape as that of the partition-wall entirely surrounded cell $2a$ and has the same area of the open end. Herein the "cell 2 that has the same shape as that of the partition-wall entirely surrounded cell $2a$ and has the same area of the open end" refers to a polygon having angular parts in the same number as that of the partition-wall entirely surrounded cell $2a$ and having the area of the open end that is 95 to 105%. Hereinafter a circumferential-wall partially surrounded cell $2b$ "that has the same shape as that of the partition-wall entirely surrounded cell $2a$ and has the same area of the open end" refers to a "circumferential-wall partially surrounded full cell".

Figure 9:
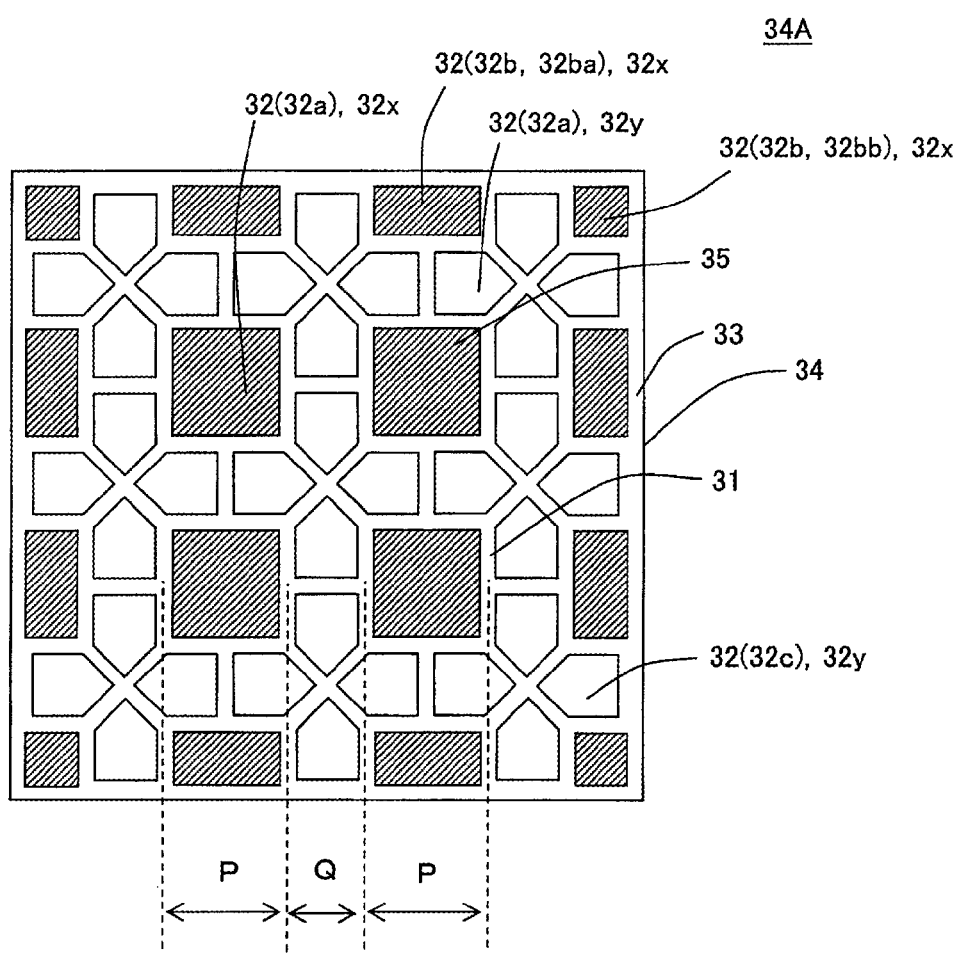
FIG. 9 is a schematic plan view of a plugged honeycomb segment included in the plugged honeycomb structure that is a second embodiment of the present invention viewed from the inflow end face.

The circumferential-wall partially surrounded cells $2b$ can be divided into a one-side circumferential wall cell $2ba$ and a two-side circumferential wall cell $32bb$ (see FIG. 9). Herein, the one-side circumferential wall cell $2ba$ is a cell 2 whose one side in a cross section orthogonal to the extending direction of the cells 2 is defined by the segment circumferential wall 3. Then as shown in FIG. 9, the two-side circumferential wall cell 32*bb* is a cell 32 whose two sides in a cross section orthogonal to the extending direction of the cells 32 are defined by a segment circumferential wall 33. Then, the one-side circumferential wall cell satisfies the following condition (1), and the two-side circumferential wall cell satisfies the following condition (2A) or condition (2B).

Condition (1): a one-side circumferential wall cell has the area of open end that is 45 to 55% of the area of open end of the partition-wall entirely surrounded cell including the shape of the one-side circumferential wall cell.

Condition (2A): no two-side circumferential wall cell is present in each of the honeycomb segments 4.

Condition (2B): a two-side circumferential wall cell has the area of open end that is 20 to 30% of the area of open end of the partition-wall entirely surrounded cell including the shape of the two-side circumferential wall cell.

Then as shown in FIGS. 1 to 5, in the plugged honeycomb structure 100 of the present embodiment, the repeated sequence pattern of the cells 2 is kept at the boundary between two honeycomb segments 4, 4 bonded with the bonding layer 6 at the inflow end face 11 and the outflow end face 12. The thus configured plugged honeycomb structure 100 can be used favorably as a trapping filter to remove particulate matter included in exhaust gas, and this plugged honeycomb structure 100 has low pressure loss and excellent thermal shock resistance. In the plugged honeycomb structure 100 shown in FIGS. 1 to 5, the condition (2A) as stated above holds, and so no two-side circumferential wall cells are present in the honeycomb segment 4.

Herein the "repeated sequence pattern of the cells 2 is kept at the boundary between two honeycomb segments 4, 4 at the inflow end face 11 and the outflow end face 12" refers to the following configuration. Two honeycomb segments 4, 4 bonded with the bonding layer 6 have the same "repeated sequence pattern of the cells 2". Then, the cells 2 formed at the outermost circumference of one of the honeycomb segments 4 and the cells 2 formed at the outermost circumference of the other honeycomb segment 4 are configured so as to reproduce a part of the "repeated sequence pattern" as stated above with the bonding layer 6 sandwiched therebetween. Specifically the one honeycomb segment 4 and the other honeycomb segment 4 are bonded with the bonding layer 6 sandwiched therebetween in the state of the following states of (a) to (c).

(a) As shown in FIG. 4, when "a one-side circumferential wall cells 2*ba*" is present at the outermost circumference of one of the honeycomb segments 4, "a one-side circumferential wall cells 2*ba*" is present at the outermost circumference of the other honeycomb segment 4 as well with the bonding layer 6 sandwiched therebetween. In this (a), the two "one-side circumferential wall cells 2*ba*" present with the bonding layer 6 sandwiched therebetween have a shape that is a part of the shape of the partition-wall entirely surrounded cell 2*a* of the same shape, and have the area of open end that is 45 to 55% of the area of open end of the partition-wall entirely surrounded cell 2*a*. Therefore when the cell shape of the "one-side circumferential wall cell 2*ba*" in the one honeycomb segment 4 and the cell shape of the "one-side circumferential wall cell 2*ba*" in the other honeycomb segment 4 are virtually combined, the cell shape having the area of open end that is 90 to 110% of the partition-wall entirely surrounded cell 2*a* can be achieved.

(b) As shown in FIG. 9, when "a two-side circumferential wall cell 32*bb*" is present at the outermost circumference of one honeycomb segment 34, "a two-side circumferential wall cell 32*bb* (not illustrated)" is present at the outermost circumference of the other honeycomb segment 34 (not illustrated) as well with the bonding layer sandwiched therebetween. Then, a plurality of the honeycomb segments 34 are disposed so that the corresponding corners of the four honeycomb segments 34 are opposed to each other. In this (b), each of the four "two-side circumferential wall cell 32*bb*" present with the bonding layer sandwiched therebetween has a shape that is a part of the shape of the partition-wall entirely surrounded cell 32*a* of the same shape, and has the area of open end that is 20 to 30% of the area of open end of this partition-wall entirely surrounded cell 32*a*. Therefore the cell shape similar to that of the partition-wall entirely surrounded cell 32*a* can be achieved by combining the cell shape of the "two-side circumferential wall cell 32*bb*" of one honeycomb segments 34 and the cell shapes of the "two-side circumferential wall cells 32*bb* (not illustrated)" of the other three honeycomb segments 34 (not illustrated). That is, the four "two-side circumferential wall cell 32*bb*" are combined virtually, whereby the cell shape that is 80 to 120% of the area of open end of the partition-wall entirely surrounded cell 32*a* can be achieved. FIG. 9 is a schematic plan view of a honeycomb segment included in the plugged honeycomb structure that is the second embodiment of the present invention viewed from the inflow end face.

(c) As shown in FIG. 9, when a "circumferential-wall partially surrounded full cell 32*c*" is present at the outermost circumference of one honeycomb segment 34, "a circumferential-wall partially surrounded full cell 32*c* (not illustrated)" is present at the outermost circumference of the other honeycomb segment 34 (not illustrated) as well with the bonding layer 6 sandwiched therebetween. Then, the "circumferential-wall partially surrounded full cell 32*c* (not illustrated)" in the one honeycomb segment 34 and the "circumferential-wall partially surrounded full cell 32*c* (not illustrated)" in the other honeycomb segment 34 (not illustrated) are configured to be included in one repeated sequence pattern.

In the states (a) to (c) as stated above, the honeycomb segments bonded to each other may have the following displacement in the extending direction of the boundary. Let that the size of the honeycomb segment in the extending direction of the boundary is 100%, the honeycomb segments bonded to each other may have a displacement corresponding to 8% or less in the extending direction of the boundary vertically and laterally. The displacement in the extending direction of the boundary of the cells is 5% or less preferably, and 3% or less particularly preferably. The cells may have substantially no displacement in the extending direction of the boundary (i.e., the displacement is 0%).

The overall shape of the plugged honeycomb structure 100 is not limited especially. For instance, the plugged honeycomb structure 100 shown in FIG. 1 has the overall shape that is a round-pillar shape where the inflow end face 11 and the outflow end face 12 are circular in shape. Although not illustrated, the overall shape of the plugged honeycomb structure may be a pillar shape, where the inflow end face and the outflow end face are substantially circular in shape, including an ellipse, a race-track shape, or an oval. Alternatively, the plugged honeycomb structure may have the overall shape that is a polygonal prismatic columnar shape, where the inflow end face and the outflow end face are a quadrangle, a hexagon or the like.

The material of the honeycomb segments is not limited especially, and various types of ceramics, such as oxides and non-oxides, and metals are preferable as a major component, from the viewpoints of strength, heat resistance, durability and the like. Specifically, examples of the ceramics include cordierite, mullite, alumina, spinel, silicon carbide, silicon nitride, and aluminum titanate. Examples of the metals include Fe—Cr—Al based metals and metal silicon. One type or two types or more selected from these materials may be included as a major component. Particularly preferably, one type or two types or more selected from the group consisting of alumina, mullite, aluminum titanate, cordierite, silicon carbide, and silicon nitride is contained as a major component from the viewpoints of high strength and high heat resistance. Silicon carbide or silicon-silicon carbide composite materials are particularly suitable from the viewpoints of high heat conductivity and high heat resistance. Herein, the "major component" refers to the component making up 50 mass % or more of the honeycomb segments, 70 mass % or more preferably and 80 mass % or more more preferably.

The material of the plugging portions is not limited especially. The material of the plugging portions preferably includes one type or two types or more selected from the various types of ceramics and metals mentioned above for the suitable materials of the honeycomb segment.

The plugged honeycomb structure of the present embodiment includes a plurality of honeycomb segments (specifically plugged honeycomb segments) that are bonded to each other via the bonding layer. With this configuration, thermal stress applied to the plugged honeycomb structure can be distributed, and so cracks due to local temperature rise can be prevented effectively.

The size of the honeycomb segments is not limited especially. Note here that if the size of one honeycomb segment is too large, sufficient effect of preventing cracks may not be exerted. If the size of one honeycomb segment is too small, the bonding of the honeycomb segments with the bonding layer may be troublesome.

The shape of the honeycomb segments is not limited especially. For instance, examples of the shape of the honeycomb segments include a polygonal prismatic columnar shape, where the cross-sectional shape orthogonal to the axial direction of the honeycomb segment is a quadrangle, a hexagon or the like.

Honeycomb segments disposed at the outermost circumference of the plugged honeycomb structure may have a prismatic columnar shape, a part of which is processed by grinding or the like in accordance with the overall shape of the plugged honeycomb structure.

As shown in FIGS. 1 to 5, the inflow cells 2y formed in the honeycomb segment 4 of the plugged honeycomb structure 100 of the present embodiment have an apparent cross-sectional shape orthogonal to the center axial direction of the inflow cells 2y that is a substantially pentagon. Then, the outflow cells 2x formed in the honeycomb segment 4 have an apparent cross-sectional shape orthogonal to the center axial direction of the outflow cells 2x that is a substantially square. Herein, the "cross-sectional shape" refers to a shape appearing in the cross section when the cells 2 are cut along a plane orthogonal to the center axial direction, and refers to the shape of a part surrounded with the partition wall 1 defining the cells 2. Then, each of the honeycomb segments 4 in the plugged honeycomb structure 100 of the present embodiment has a repeated sequence pattern of the cells such that eight inflow cells 2y having a substantially pentagonal cross-sectional shape surround one outflow cell 2x having a substantially square cross-sectional shape. With this configuration, the plugged honeycomb structure 100 of the present embodiment can have a large filtering area of each honeycomb segment 4 as compared with the conventional plugged honeycomb structures when they are used as a filter. Therefore pressure loss after PM accumulation can be reduced. Further, in the thus configured honeycomb segment 4, the outflow cells 2x are not adjacent to each other, and the outflow cells 2x are surrounded entirely with the inflow cells 2y. This can increase the open frontal area of the outflow cells 2x, and can decrease the number of the outflow cells 2x compared with the number of the inflow cells 2y, so that pressure loss during the initial stage of the operation of the plugged honeycomb structure 100 can be reduced.

As shown in FIGS. 1 to 5, preferably the inflow cells 2y having a substantially pentagonal cross-sectional shape are not a regular pentagon in shape, but have a so-called home plate shape, for example, whose inner angles are 90°, 135°, 90°, 90°, and 135° that are clockwise from one vertex. With this configuration, four inflow cells 2y are formed adjacent to each other so that corners at the tip ends of the home plate shapes are collected. At the part of the four inflow cells 2y where corners at their tip ends of the home plate shapes are collected, two partition walls 1 are at right angles to each other. Therefore, heat capacity at the partition walls 1 at the part of the collected corners can be kept high, and so thermal stress during burning of PM can be absorbed.

Figure 8:
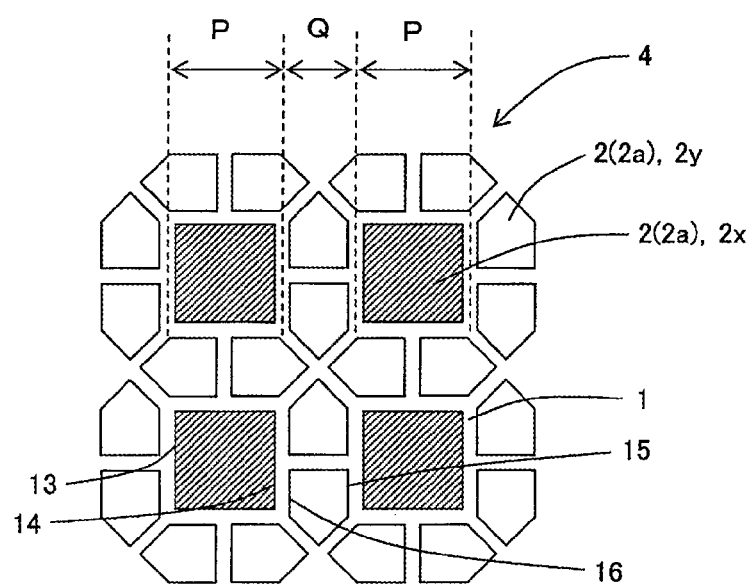
FIG. 8 is a schematic partially enlarged view of the plugged honeycomb structure that is the first embodiment of the present invention viewed from the inflow end face.

As shown in FIG. 8, a distance P between the partition wall 1 defining a first side 13 of an outflow cell 2x and the partition wall 1 defining a second side 14 opposed to the first side 13 of the outflow cell 2x is preferably in the range of exceeding 0.8 mm and less than 2.4 mm. Herein, the distance P refers to a shortest distance connecting the center in the thickness direction of the partition wall 1 defining the first side 13 and the center in the thickness direction of the partition wall 1 defining the second side 14 opposed thereto. As shown in FIG. 9, a distance Q is the distance between the partition wall 1 defining a third side 15 of the inflow cell 2y that is adjacent substantially parallel to one side of the outflow cell 2x and the partition wall 1 defining a fourth side 16 opposed to the third side 15 of the inflow cell 2y. Then the ratio of the distance Q to the distance P is preferably in the range of exceeding 0.4 and less than 1.1. Herein, the distance Q refers to a shortest distance connecting the center in the thickness direction of the partition wall 1 defining the third side 15 and the center in the thickness direction of the partition wall 1 defining the fourth side 16 opposed thereto. The relationship between the distance P and the distance Q in the above range is preferable because it allows pressure loss during the initial stage and pressure loss after PM accumulation to be reduced while having good balance. FIG. 8 is a schematic partially enlarged view of the plugged honeycomb structure that is the first embodiment of the present invention viewed from the inflow end face.

The segment circumferential wall of the honeycomb segments preferably has a thickness of 0.3 to 1.0 mm, 0.3 to 0.8 mm more preferably, and 0.4 to 0.6 mm particularly preferably. If the thickness of the segment circumferential wall of the honeycomb segments is less than 0.3 mm, the strength of the honeycomb segments deteriorates unfavorably. If the thickness of the segment circumferential wall of the honeycomb segments exceeds 1.0 mm, pressure loss increases, and thermal shock resistance may deteriorate unfavorably.

The bonding layer preferably has a thickness of 0.5 to 1.5 mm, 0.7 to 1.3 mm more preferably, and 0.8 to 1.2 mm particularly preferably. If the thickness of the bonding layer is less than 0.5 mm, the thermal shock resistance may deteriorate unfavorably. If the thickness of the bonding layer exceeds 1.5 mm, pressure loss may increase unfavorably.

In the plugged honeycomb structure of the present embodiment, the partition-wall entirely surrounded cells include two types or more of cells that are different in cross-sectional shape. In the plugged honeycomb structure 100 shown in FIGS. 1 to 5, the partition-wall entirely surrounded cells 2a having a first cross-sectional shape are the outflow cells 2x having a substantially square cross-sectional shape, and the partition-wall entirely surrounded cells 2a having a second cross-sectional shape are the inflow cells 2y having a substantially pentagonal cross-sectional shape. With this configuration, the cells having at least two types or more of cross-sectional shapes define a predetermined repeated sequence pattern favorably. When the cells have a polygonal cross-sectional shape, the angular parts of the polygon may have a curved shape having R. For instance, a substantial square is the inclusive term of a square cross-sectional shape and a square cross-sectional shape having at least one corner that is a curved shape having R. Similarly a substantial pentagon is the inclusive term of a pentagonal cross-sectional shape and a pentagonal cross-sectional shape having at least one corner that is a curved shape having R.

The thickness of the partition wall 1 is not limited especially. For instance, the thickness of the partition wall 1 that is present between one side of one of the cells 2 and one side of another cell 2 adjacent substantially parallel to the one cell 2 is 0.07 to 0.51 mm preferably, 0.10 to 0.46 mm more preferably and 0.12 to 0.38 mm particularly preferably. If the thickness of the partition wall 1 is smaller than 0.07 mm, it may be difficult to form the honeycomb segments 4 unfavorably. If the thickness of the partition wall 1 is larger than 0.51 mm, it is not preferable from the viewpoints of enough filtering area and a decrease in pressure loss.

In the plugged honeycomb structure of the present embodiment, one of the favorable examples includes each of the honeycomb segments having the following configuration. The inflow cells 2y preferably have a geometrical surface area GSA of 10 to 30 $cm^2/cm^3$, and 12 to 18 $cm^2/cm^3$ more preferably. The "geometrical surface area GSA" is a value (SN) obtained by dividing the overall inner surface area (S) of the inflow cells 2y by the overall capacity (V) of the honeycomb segment. Since a larger filtering area of a filter typically leads to a decrease in thickness of PM accumulated at the partition wall, such a numerical range of the geometrical surface area GSA can control the pressure loss of the plugged honeycomb structure to be low. Therefore, if the geometrical surface area GSA of the inflow cells 2y is smaller than 10 $cm^2/cm^3$, this leads to an increase in pressure loss after PM accumulation unfavorably. If it is larger than 30 $cm^2/cm^3$, the pressure loss at the initial stage may increase unfavorably.

In the plugged honeycomb structure of the present embodiment, the inflow cells 2y preferably have a cell open frontal area of 20 to 70%, and 25 to 65% more preferably. If the cell open frontal area of the inflow cells 2y is smaller than 20%, the pressure loss at the initial stage may increase unfavorably. If it is larger than 70%, the filtration rate increases, which leads to deterioration in trapping efficiency of PM, and further the strength of the partition wall 1 may not be enough unfavorably. The "cell open frontal area of the inflow cells 2y" refers to the ratio of "the total cross-sectional area of the inflow cells 2y" to the sum of "the cross-sectional area of the entire partition wall 1 formed in the plugged honeycomb structure" and "the total cross-sectional area of all of the cells 2" in a cross section perpendicular to the center axial direction of the plugged honeycomb structure.

In the plugged honeycomb structure of the present embodiment, each of the plurality of cells 2 preferably has a hydraulic diameter of 0.5 to 2.5 mm, and 0.8 to 2.2 mm more preferably. If the hydraulic diameter of each of the plurality of cells 2 is smaller than 0.5 mm, the initial pressure loss may increase unfavorably. If the hydraulic diameter of each of the plurality of cells 2 is larger than 2.5 mm, contact area of exhaust gas with the partition wall 1 decreases, and the purification efficiency may deteriorate unfavorably. Herein, the hydraulic diameter of each of the plurality of cells 2 is a value calculated by "4×(cross-sectional area)/(circumferential length)" based on the cross-sectional area and the circumferential length of each cell 2. The cross-sectional area of the cell 2 refers to the area of the shape of cell (cross-sectional shape) appearing in a cross section perpendicular to the center axial direction of the plugged honeycomb structure, and the circumferential length of the cell refers to the length of the circumference of the cross-sectional shape of the cell (length of a closed line surrounding the cross section).

Considering the trade-off among the initial pressure loss, the pressure loss after PM accumulation and the trapping efficiency, the plugged honeycomb structure of the present embodiment preferably satisfies the following configurations at the same time. That is, the inflow cells 2y have a geometrical surface area GSA of 10 to 30 $cm^2/cm^3$, the inflow cells 2y have a cell open frontal area of 20 to 70%, and each of the plurality of cells 2 has a hydraulic diameter of 0.5 to 2.5 mm, which are satisfied at the same time preferably. More preferably, the followings are satisfied at the same time, i.e., the inflow cells 2y have a geometrical surface area GSA of 12 to 18 $cm^2/cm^3$, the inflow cells 2y have a cell open frontal area of 25 to 65%, and each of the plurality of cells 2 has a hydraulic diameter of 0.8 to 2.2 mm.

In the plugged honeycomb structure of the present embodiment, the partition wall 1 defining the plurality of cells 2 may be loaded with catalyst. The partition wall 1 loaded with catalyst means that the surface of the partition wall 1 and the inner wall of pores formed at the partition wall 1 are coated with the catalyst. Examples of the types of catalyst include SCR catalyst (zeolite, titania, vanadium), at least two types of noble metals of Pt, Rh, and Pd, and three-way catalyst containing at least one type of alumina, ceria, and zirconia. Loading with such catalyst enables detoxication of NOx, CO, HC and the like contained in exhaust gas emitted from a direct injection type gasoline engine and a diesel engine, for example, and facilitates combustion of the PM accumulated at the surface of the partition wall 1 for removal due to the catalyst action.

The method for loading of such catalyst at the plugged honeycomb structure of the present embodiment is not limited especially, and a method typically performed by a person skilled in the art can be used. Specifically, catalyst slurry may be wash-coated, followed by drying and firing, for example.

The following describes other embodiments (second embodiment to ninth embodiment) of the plugged honeycomb structure of the present invention. The plugged honeycomb structures of the second embodiment to the ninth embodiment are preferably configured similarly to the first embodiment other than that the plugged honeycomb segments thereof are different from the plugged honeycomb segments included in the plugged honeycomb structure of the first embodiment. FIGS. 9 to 14, FIG. 16 and FIG. 17 are schematic plan views of the plugged honeycomb segments included in the plugged honeycomb structures that are the second embodiment to the ninth embodiment of the present invention viewed from the inflow end face. FIG. 15 is a schematic plan view of a honeycomb segment bonded member including the plugged honeycomb segments shown in FIG. 14 viewed from the inflow end face.

The plugged honeycomb structure of the second embodiment includes a plugged honeycomb segment 34A as shown in FIG. 9. The honeycomb segment 34 includes a porous partition wall 31 that defines a plurality of cells 32, and a segment circumferential wall 33 disposed at the outermost circumference. Plugging portions 35 are disposed at the open ends of outflow cells 32$x$ and at open ends of inflow cells 32$y$ of the honeycomb segment 34. Then the plugging portions 35 are disposed at the open ends of the cells 32 so that the inflow cells 32$y$ surround an outflow cell 32$x$ except for the circumferential region of the honeycomb segment 34.

The plugged honeycomb segment 34A shown in FIG. 9 has a "repeated sequence pattern" made up of outflow cells 32$x$ having a quadrangular cross-sectional shape and inflow cells 32$y$ having a pentagonal cross-sectional shape.

The quadrangular outflow cells 32$x$ include partition-wall entirely surrounded cells 32$a$ having a square cross-sectional shape and circumferential-wall partially surrounded cells 32$b$ having a part of the shape of the partition-wall entirely surrounded cell 32$a$. Then, the circumferential-wall partially surrounded cells 32$b$ of the outflow cells 32$x$ further include one-side circumferential wall cells 32$ba$ having a rectangular cross-sectional shape and two-side circumferential wall cells 32$bb$ having a square cross-sectional shape. The one-side circumferential wall cells 32$ba$ satisfy the condition (1) as stated above, and the two-side circumferential wall cells 32$bb$ satisfy the condition (2B) as stated above. The pentagonal inflow cells 32$y$ include partition-wall entirely surrounded cells 32$a$ having a pentagonal cross-sectional shape and circumferential-wall partially surrounded full cells 32$c$ having the same cross-sectional shape as that of these partition-wall entirely surrounded cells 32$a$.

Figure 10:
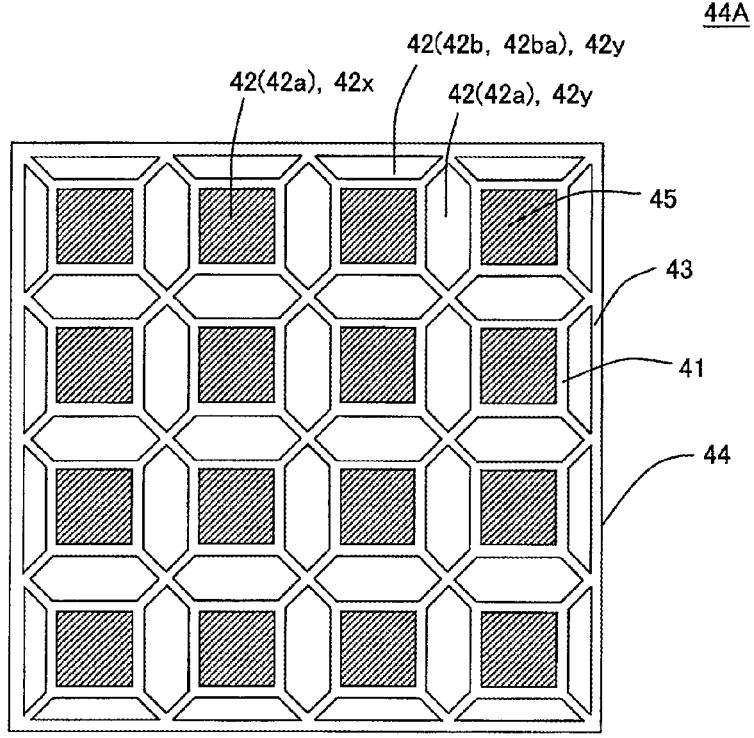
FIG. 10 is a schematic plan view of a plugged honeycomb segment included in the plugged honeycomb structure that is a third embodiment of the present invention viewed from the inflow end face.

The plugged honeycomb structure of the third embodiment includes a plugged honeycomb segment 44A as shown in FIG. 10. The honeycomb segment 44 includes a porous partition wall 41 that defines a plurality of cells 42, and a segment circumferential wall 43 disposed at the outermost circumference. Plugging portions 45 are disposed at the open ends of outflow cells 42$x$ and at open ends of inflow cells 42$y$ of the honeycomb segment 44. Then the plugging portions 45 are disposed at the open ends of the cells 42 so that the inflow cells 42$y$ surround an outflow cell 42$x$ except for the circumferential region of the honeycomb segment 44.

The plugged honeycomb segment 44A shown in FIG. 10 has a "repeated sequence pattern" made up of outflow cells 42$x$ having a quadrangular cross-sectional shape and inflow cells 42$y$ having a hexagonal cross-sectional shape.

All of the outflow cells 42$x$ are partition-wall entirely surrounded cells 42$a$ having a square cross-sectional shape. The inflow cells 42$y$ include partition-wall entirely surrounded cells 42$a$ having a hexagonal cross-sectional shape and circumferential-wall partially surrounded cells 42$b$ having a part of the shape of the partition-wall entirely surrounded cell 42$a$. Then, all of the circumferential-wall partially surrounded cells 42$b$ of the inflow cells 42$y$ are one-side circumferential wall cells 42$ba$. Each of the one-side circumferential wall cells 42$ba$ in the plugged honeycomb segment 44A of FIG. 10 can be said to have a shape obtained by joining two one-side circumferential wall cells 2$ba$ of the one-side circumferential wall cells 2$ba$ shown in FIG. 4.

Figure 11:
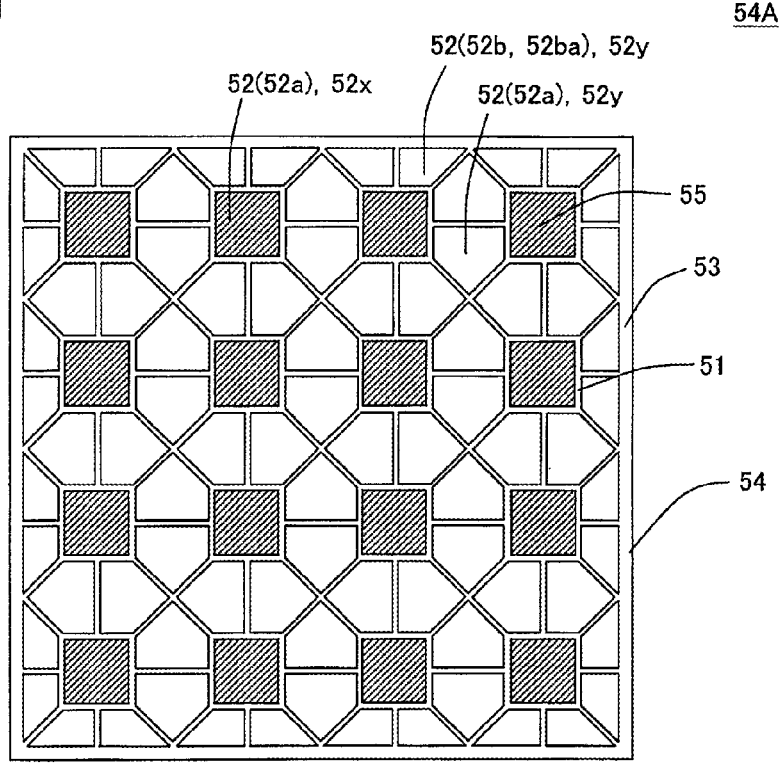
FIG. 11 is a schematic plan view of a plugged honeycomb segment included in the plugged honeycomb structure that is a fourth embodiment of the present invention viewed from the inflow end face.

The plugged honeycomb structure of the fourth embodiment includes a plugged honeycomb segment 54A as shown in FIG. 11. The honeycomb segment 54 includes a porous partition wall 51 that defines a plurality of cells 52, and a segment circumferential wall 53 disposed at the outermost circumference. Plugging portions 55 are disposed at the open ends of outflow cells 52$x$ and at open ends of inflow cells 52$y$ of the honeycomb segment 54. Then the plugging portions 55 are disposed at the open ends of the cells 52 so that the inflow cells 52$y$ surround an outflow cell 52$x$ except for the circumferential region of the honeycomb segment 54.

The plugged honeycomb segment 54A shown in FIG. 11 has a "repeated sequence pattern" made up of outflow cells 52$x$ having a quadrangular cross-sectional shape and inflow cells 52$y$ having a pentagonal cross-sectional shape.

All of the outflow cells 52$x$ are partition-wall entirely surrounded cells 52$a$ having a square cross-sectional shape. The inflow cells 52$y$ include partition-wall entirely surrounded cells 52$a$ having a pentagonal cross-sectional shape and circumferential-wall partially surrounded cells 52$b$ having a part of the shape of the partition-wall entirely surrounded cell 52$a$. Then, all of the circumferential-wall partially surrounded cells 52$b$ of the inflow cells 52$y$ are one-side circumferential wall cells 52$ba$. The plugged honeycomb segment 54A shown in FIG. 11 has the same configuration as that of the plugged honeycomb segment 4A shown in FIG. 4 other than that relative size (area of open ends) between the outflow cells 52$x$ and the inflow cells 52$y$ is different from that of the plugged honeycomb segment 4A of FIG. 4.

Figure 12:
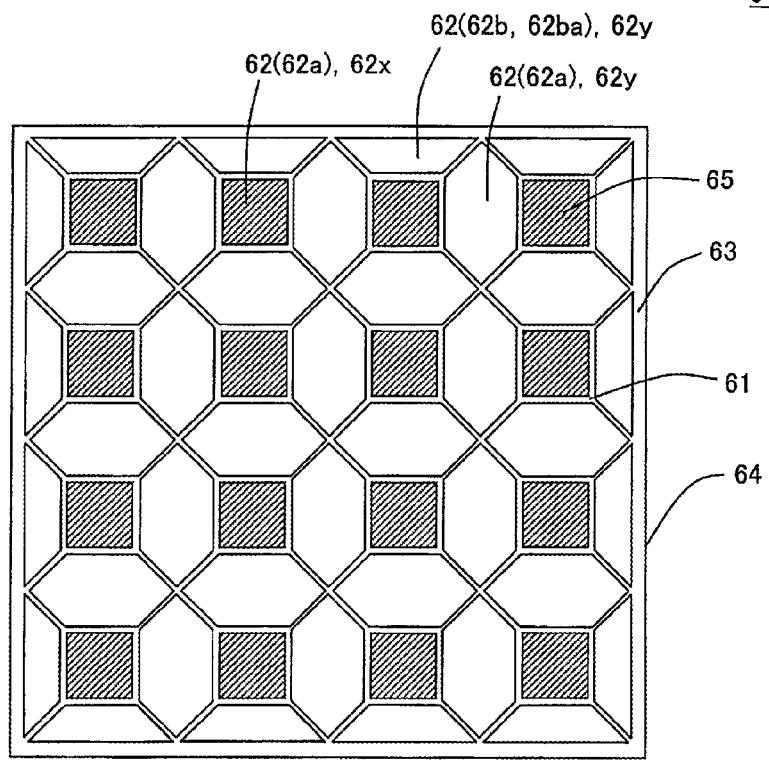
FIG. 12 is a schematic plan view of a plugged honeycomb segment included in the plugged honeycomb structure that is a fifth embodiment of the present invention viewed from the inflow end face.

The plugged honeycomb structure of the fifth embodiment includes a plugged honeycomb segment 64A as shown in FIG. 12. The honeycomb segment 64 includes a porous partition wall 61 that defines a plurality of cells 62, and a segment circumferential wall 63 disposed at the outermost circumference. Plugging portions 65 are disposed at the open ends of outflow cells 62$x$ and at open ends of inflow cells 62$y$ of the honeycomb segment 64. Then the plugging portions 65 are disposed at the open ends of the cells 62 so that the inflow cells 62$y$ surround an outflow cell 62$x$ except for the circumferential region of the honeycomb segment 64.

The plugged honeycomb segment 64A shown in FIG. 12 has a "repeated sequence pattern" made up of outflow cells 62$x$ having a quadrangular cross-sectional shape and inflow cells 62$y$ having a hexagonal cross-sectional shape.

All of the outflow cells 62$x$ are partition-wall entirely surrounded cells 62$a$ having a square cross-sectional shape. The inflow cells 62$y$ include partition-wall entirely surrounded cells 62$a$ having a hexagonal cross-sectional shape and circumferential-wall partially surrounded cells 62$b$ having a part of the shape of the partition-wall entirely surrounded cell 62$a$. Then, all of the circumferential-wall partially surrounded cells 62$b$ of the inflow cells 62$y$ are one-side circumferential wall cells 62$ba$. The plugged honeycomb segment 64A shown in FIG. 12 has the same configuration as that of the plugged honeycomb segment 44A shown in FIG. 10 other than that relative size (area of open ends) between the outflow cells 62$x$ and the inflow cells 62$y$ is different from that of the plugged honeycomb segment 44A of FIG. 10.

Figure 13:
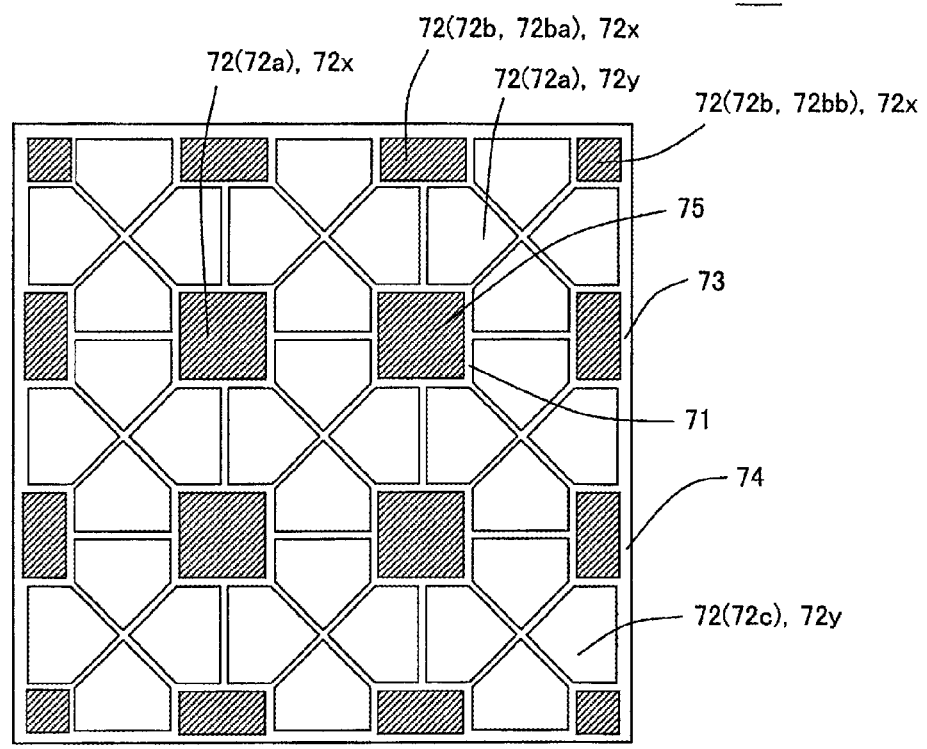
FIG. 13 is a schematic plan view of a plugged honeycomb segment included in the plugged honeycomb structure that is a sixth embodiment of the present invention viewed from the inflow end face.

The plugged honeycomb structure of the sixth embodiment includes a plugged honeycomb segment 74A as shown in FIG. 13. The honeycomb segment 74 includes a porous partition wall 71 that defines a plurality of cells 72, and a segment circumferential wall 73 disposed at the outermost circumference. Plugging portions 75 are disposed at the open ends of outflow cells 72x and at open ends of inflow cells 72y of the honeycomb segment 74. Then the plugging portions 75 are disposed at the open ends of the cells 72 so that the inflow cells 72y surround an outflow cell 72x except for the circumferential region of the honeycomb segment 74.

The plugged honeycomb segment 74A shown in FIG. 13 has a "repeated sequence pattern" made up of outflow cells 72x having a quadrangular cross-sectional shape and inflow cells 72y having a pentagonal cross-sectional shape.

The outflow cells 72x include partition-wall entirely surrounded cells 72a having a square cross-sectional shape and circumferential-wall partially surrounded cells 72b having a part of the shape of the partition-wall entirely surrounded cell 72a. Then, the circumferential-wall partially surrounded cells 72b of the outflow cells 72x further include one-side circumferential wall cells 72ba having a rectangular cross-sectional shape and two-side circumferential wall cells 72bb having a square cross-sectional shape. The one-side circumferential wall cells 72ba satisfy the condition (1) as stated above, and the two-side circumferential wall cells 72bb satisfy the condition (2B) as stated above. The inflow cells 72y include partition-wall entirely surrounded cells 72a having a pentagonal cross-sectional shape and circumferential-wall partially surrounded full cells 72c having the same shape as that of this partition-wall entirely surrounded cell 72a. The plugged honeycomb segment 74A shown in FIG. 13 has the same configuration as that of the plugged honeycomb segment 34A shown in FIG. 9 other than that relative size (area of open ends) between the outflow cells 72x and the inflow cells 72y is different from that of the plugged honeycomb segment 34A of FIG. 9.

Figure 14:
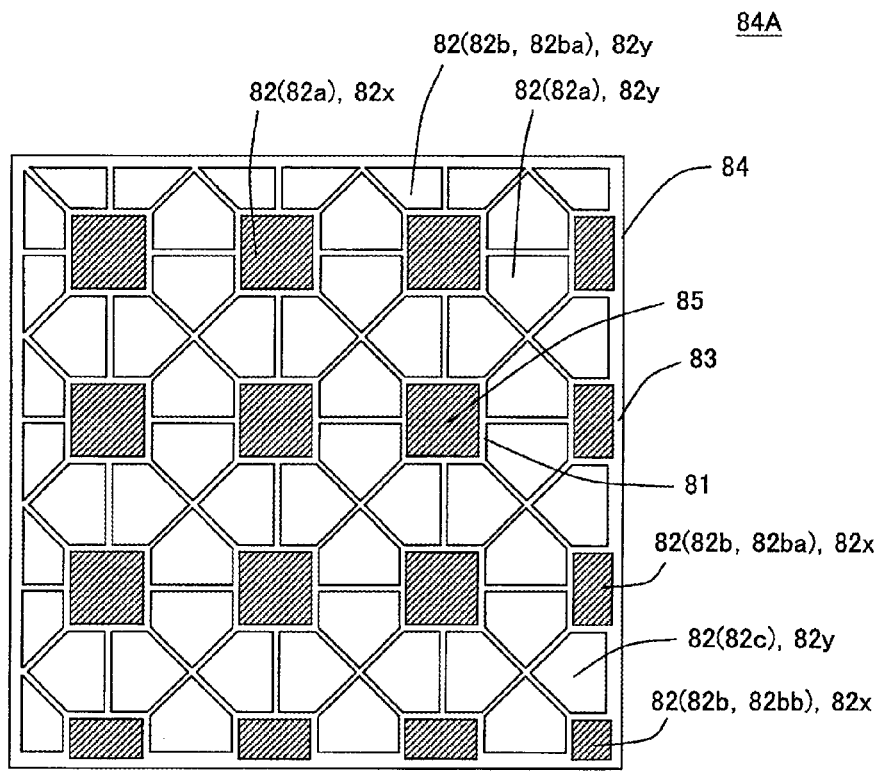
FIG. 14 is a schematic plan view of a plugged honeycomb segment included in the plugged honeycomb structure that is a seventh embodiment of the present invention viewed from the inflow end face.
Figure 15:
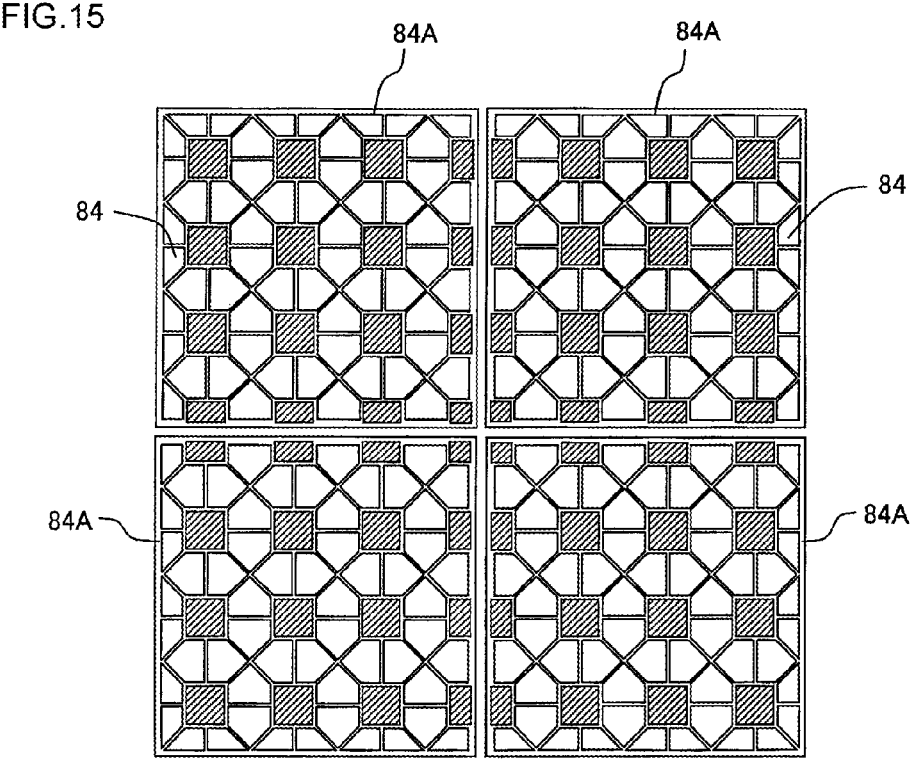
FIG. 15 is a schematic plan view of a honeycomb segment bonded member including the plugged honeycomb segments shown in FIG. 14 viewed from the inflow end face.

The plugged honeycomb structure of the seventh embodiment includes a plugged honeycomb segment 84A as shown in FIG. 14. The honeycomb segment 84 includes a porous partition wall 81 that defines a plurality of cells 82, and a segment circumferential wall 83 disposed at the outermost circumference. Plugging portions 85 are disposed at the open ends of outflow cells 82x and at open ends of inflow cells 82y of the honeycomb segment 84. Then the plugging portions 85 are disposed at the open ends of the cells 82 so that the inflow cells 82y surround an outflow cell 82x except for the circumferential region of the honeycomb segment 84.

The plugged honeycomb segment 84A shown in FIG. 14 has a "repeated sequence pattern" made up of outflow cells 82x having a quadrangular cross-sectional shape and inflow cells 82y having a pentagonal cross-sectional shape.

The outflow cells 82x include partition-wall entirely surrounded cells 82a having a square cross-sectional shape and circumferential-wall partially surrounded cells 82b having a part of the shape of the partition-wall entirely surrounded cell 82a. Then, the circumferential-wall partially surrounded cells 82b of the outflow cells 82x further include one-side circumferential wall cells 82ba having a rectangular cross-sectional shape and two-side circumferential wall cells 82bb having a square cross-sectional shape. The one-side circumferential wall cells 82ba of the outflow cells 82x satisfy the condition (1) as stated above, and the two-side circumferential wall cells 82bb satisfy the condition (2B) as stated above. The inflow cells 82y include partition-wall entirely surrounded cells 82a having a pentagonal cross-sectional shape, one-side circumferential wall cells 82ba having a part of the shape of the partition-wall entirely surrounded cell 82a, and circumferential-wall partially surrounded full cells 82c having the same shape as that of the partition-wall entirely surrounded cell 82a. The one-side circumferential wall cells 82ba of the inflow cells 82y satisfy the condition (1) as stated above.

Herein the plugged honeycomb segments in the first to the sixth embodiments are configured so that the overall cell geometry defined by the partition wall is axisymmetric in a cross section orthogonal to the axial direction of the plugged honeycomb segment. The plugged honeycomb segment 84A shown in FIG. 14 is not configured so that the overall geometry of the cells 82 defined by the partition wall 81 is axisymmetric in a cross section orthogonal to the axial direction of the plugged honeycomb segment 84A. Herein in the plugged honeycomb segment 84A shown in FIG. 14, the one-side circumferential wall cells 82ba satisfy the condition (1) and the two-side circumferential wall cells 82bb satisfy the condition (2B). Therefore the plugged honeycomb segment 84A can have the advantageous effects similar to those of the plugged honeycomb segments in the first to the sixth embodiments. As shown in FIG. 15, the plugged honeycomb segments 84A shown in FIG. 14 are disposed and bonded so that their two-side circumferential wall cells 82bb of the four plugged honeycomb segments 84A are collected at the intersection of the four plugged honeycomb segments 84A. With this configuration, the repeated sequence pattern of the cells 82 can be kept at the boundary of the four plugged honeycomb segments 84A.

Figure 16:
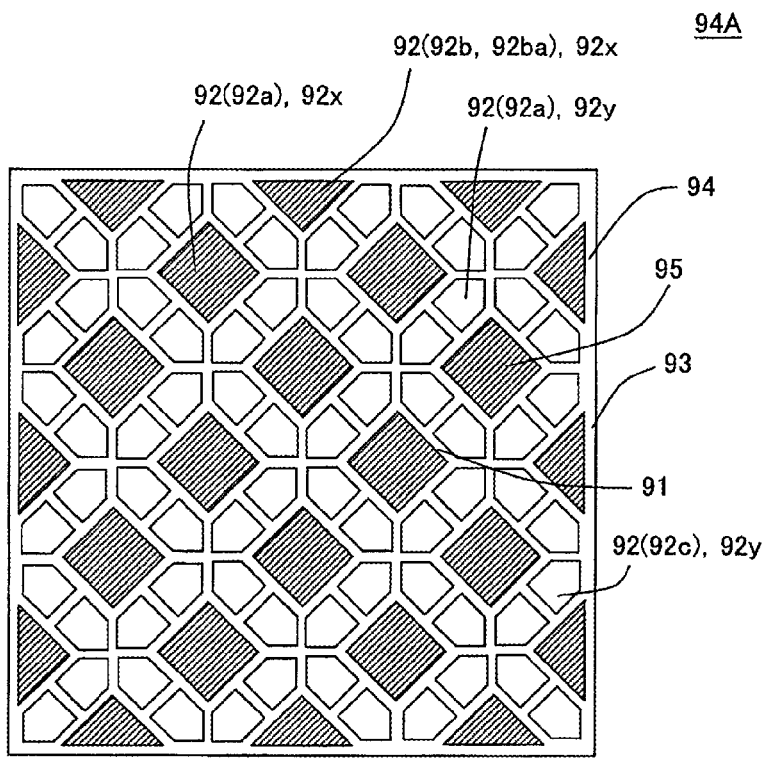
FIG. 16 is a schematic plan view of a plugged honeycomb segment included in the plugged honeycomb structure that is an eighth embodiment of the present invention viewed from the inflow end face.

The plugged honeycomb structure of the eighth embodiment includes a plugged honeycomb segment 94A as shown in FIG. 16. The honeycomb segment 94 includes a porous partition wall 91 that defines a plurality of cells 92, and a segment circumferential wall 93 disposed at the outermost circumference. Plugging portions 95 are disposed at the open ends of outflow cells 92x and at open ends of inflow cells 92y of the honeycomb segment 94. Then the plugging portions 95 are disposed at the open ends of the cells 92 so that the inflow cells 92y surround an outflow cell 92x except for the circumferential region of the honeycomb segment 94.

The plugged honeycomb segment 94A shown in FIG. 16 has a "repeated sequence pattern" made up of outflow cells 92x having a quadrangular cross-sectional shape and inflow cells 92y having a pentagonal cross-sectional shape.

The outflow cells 92x include partition-wall entirely surrounded cells 92a having a square cross-sectional shape and circumferential-wall partially surrounded cells 92b having a part of the shape of the partition-wall entirely surrounded cell 92a. Then, the circumferential-wall partially surrounded cells 92b of the outflow cells 92x are one-side circumferential wall cells 92ba having a triangular cross-sectional shape. The one-side circumferential wall cells 92ba of the outflow cells 92x satisfy the condition (1) as stated above. The inflow cells 92y include partition-wall entirely surrounded cells 92a having a pentagonal cross-sectional shape and circumferential-wall partially surrounded full cells 92c having the same shape as that of this partition-wall entirely surrounded cell 92a. The plugged honeycomb segment 94A shown in FIG. 16 has a configuration similar to that of the plugged honeycomb segment 4A shown in FIG. 7 other than that the "repeated sequence pattern" of the plugged honeycomb segment 4A shown in FIG. 7 is rotated by 45° clockwise.

Figure 17:
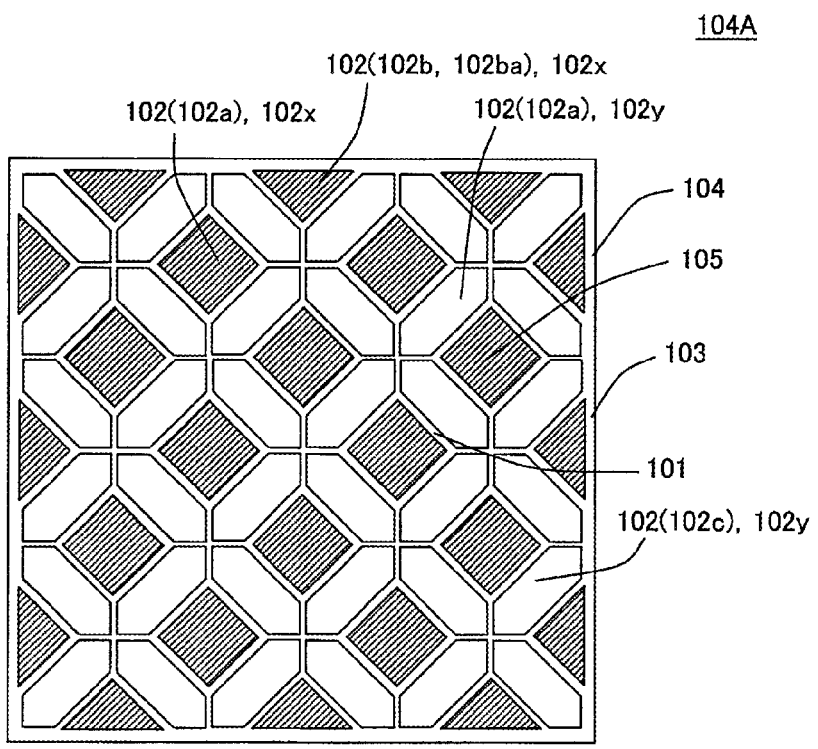
FIG. 17 is a schematic plan view of a plugged honeycomb segment included in the plugged honeycomb structure that is a ninth embodiment of the present invention viewed from the inflow end face.

The plugged honeycomb structure of the ninth embodiment includes a plugged honeycomb segment 104A as shown in FIG. 17. The honeycomb segment 104 includes a porous partition wall 101 that defines a plurality of cells 102, and a segment circumferential wall 103 disposed at the outermost circumference. Plugging portions 105 are disposed at the open ends of outflow cells 102x and at open ends of inflow cells 102y of the honeycomb segment 104. Then the plugging portions 105 are disposed at the open ends of the cells 102 so that the inflow cells 102y surround an outflow cell 102x except for the circumferential region of the honeycomb segment 104.

The plugged honeycomb segment 104A shown in FIG. 17 has a "repeated sequence pattern" made up of outflow cells 102x having a quadrangular cross-sectional shape and inflow cells 102y having a hexagonal cross-sectional shape.

The outflow cells 102x include partition-wall entirely surrounded cells 102a having a square cross-sectional shape and circumferential-wall partially surrounded cells 102b having a part of the shape of the partition-wall entirely surrounded cell 102a. Then, the circumferential-wall partially surrounded cells 102b of the outflow cells 102x are one-side circumferential wall cells 102ba having a triangular cross-sectional shape. The one-side circumferential wall cells 102ba of the outflow cells 102x satisfy the condition (1) as stated above. The inflow cells 102y include partition-wall entirely surrounded cells 102a having a hexagonal cross-sectional shape and circumferential-wall partially surrounded full cells 102c having the same shape as that of this partition-wall entirely surrounded cell 102a. The plugged honeycomb segment 104A shown in FIG. 17 has a configuration similar to that of the plugged honeycomb segment 44A shown in FIG. 10 other than that the "repeated sequence pattern" of the plugged honeycomb segment 44A shown in FIG. 10 is rotated by 45° clockwise.

The following describes still other embodiments (tenth embodiment to thirteenth embodiment) of the plugged honeycomb structure of the present invention. The plugged honeycomb structures of the tenth embodiment to the thirteenth embodiment are preferably configured similarly to the first embodiment other than that the configuration of the plugged honeycomb segments thereof are different from the plugged honeycomb segments included in the plugged honeycomb structure of the first embodiment. FIGS. 18 to 21 are schematic plan views of the plugged honeycomb segments included in the plugged honeycomb structures that are the tenth embodiment to the thirteenth embodiment of the present invention viewed from the inflow end face.

Figure 18:
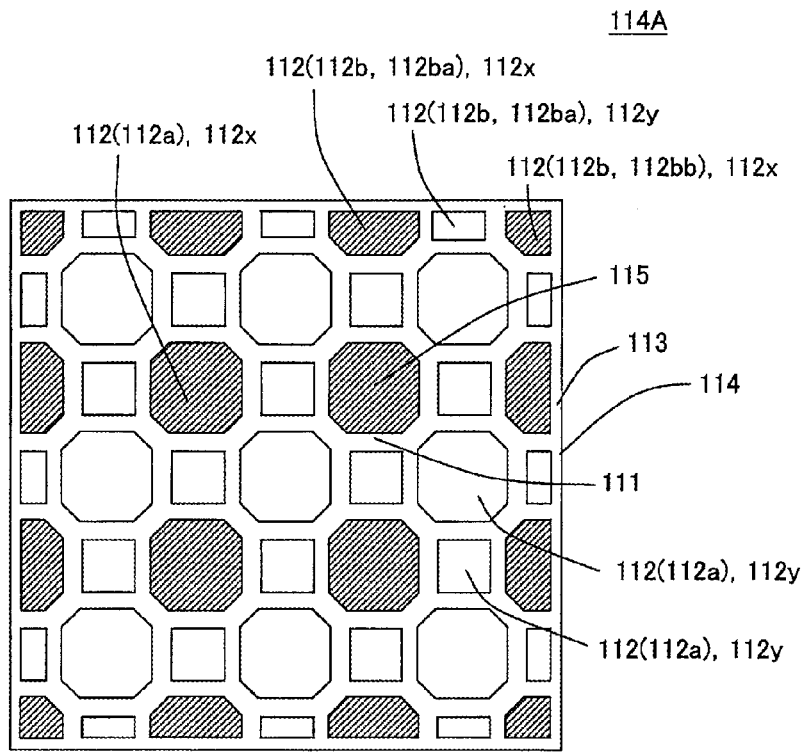
FIG. 18 is a schematic plan view of a plugged honeycomb segment included in the plugged honeycomb structure that is a tenth embodiment of the present invention viewed from the inflow end face.

The plugged honeycomb structure of the tenth embodiment includes a plugged honeycomb segment 114A as shown in FIG. 18. The honeycomb segment 114 includes a porous partition wall 111 that defines a plurality of cells 112, and a segment circumferential wall 113 disposed at the outermost circumference. Plugging portions 115 are disposed at the open ends of outflow cells 112x and at open ends of inflow cells 112y of the honeycomb segment 114. Then the plugging portions 115 are disposed at the open ends of the cells 112 so that the inflow cells 112y surround an outflow cell 112x except for the circumferential region of the honeycomb segment 114.

The plugged honeycomb segment 114A shown in FIG. 18 has a "repeated sequence pattern" made up of outflow cells 112x having an octagonal cross-sectional shape and inflow cells 112y having quadrangular and octagonal cross-sectional shapes.

The outflow cells 112x include partition-wall entirely surrounded cells 112a having an octagonal cross-sectional shape and circumferential-wall partially surrounded cells 112b having a part of the shape of the partition-wall entirely surrounded cell 112a. Then, the circumferential-wall partially surrounded cells 112b of the outflow cells 112x further include one-side circumferential wall cells 112ba and two-side circumferential wall cells 112bb. The one-side circumferential wall cells 112ba satisfy the condition (1) as stated above, and the two-side circumferential wall cells 112bb satisfy the condition (2B) as stated above. The inflow cells 112y include partition-wall entirely surrounded cells 112a of two types including a quadrangular cross-sectional shape and an octagonal cross-sectional shape, and circumferential-wall partially surrounded cells 112b including a part of the partition-wall entirely surrounded cell 112a having a quadrangular cross-sectional shape. These circumferential-wall partially surrounded cells 112b of the inflow cells 112y are one-side circumferential wall cells 112ba and satisfy the condition (1) as stated above.

Figure 19:
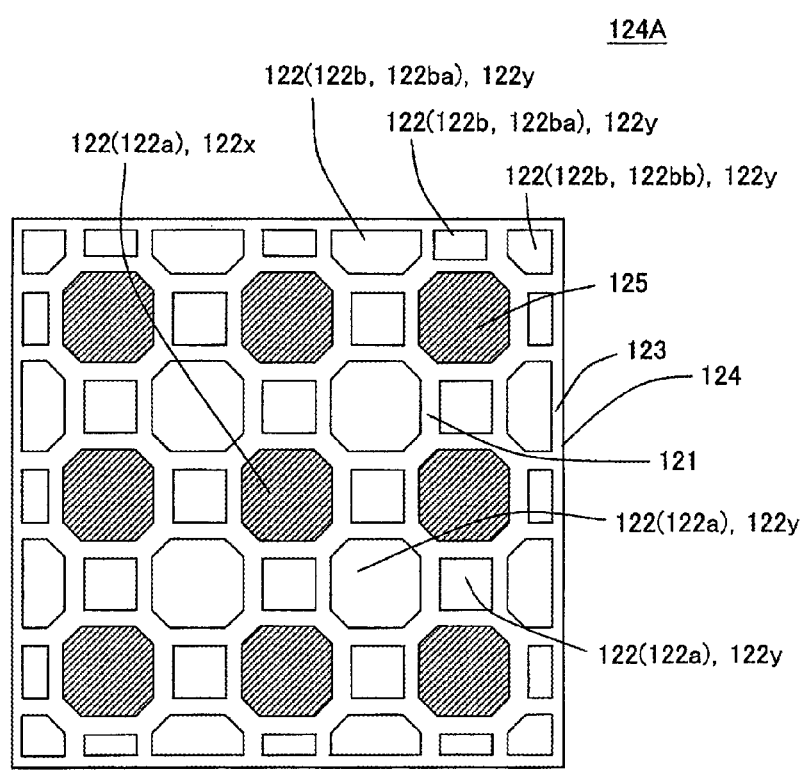
FIG. 19 is a schematic plan view of a plugged honeycomb segment included in the plugged honeycomb structure that is an eleventh embodiment of the present invention viewed from the inflow end face.

The plugged honeycomb structure of the eleventh embodiment includes a plugged honeycomb segment 124A as shown in FIG. 19. The honeycomb segment 124 includes a porous partition wall 121 that defines a plurality of cells 122, and a segment circumferential wall 123 disposed at the outermost circumference. Plugging portions 125 are disposed at the open ends of outflow cells 122x and at open ends of inflow cells 122y of the honeycomb segment 124. Then the plugging portions 125 are disposed at the open ends of the cells 122 so that the inflow cells 122y surround an outflow cell 122x except for the circumferential region of the honeycomb segment 124.

The outflow cells 122x are partition-wall entirely surrounded cells 122a having an octagonal cross-sectional shape. The inflow cells 122y include partition-wall entirely surrounded cells 122a of two types including a quadrangular cross-sectional shape and an octagonal cross-sectional shape, and circumferential-wall partially surrounded cells 122b of two types. The circumferential-wall partially surrounded cells 122b include one-side circumferential wall cells 122ba including a part of the partition-wall entirely surrounded cell 122a having a quadrangular cross-sectional shape, and two-side circumferential wall cells 122bb including a part of the partition-wall entirely surrounded cell 122a having an octagonal cross-sectional shape. The one-side circumferential wall cells 122ba satisfy the condition (1) as stated above, and the two-side circumferential wall cells 122bb satisfy the condition (2B) as stated above. The plugged honeycomb segment 124A shown in FIG. 19 has the same repeated sequence pattern as that of the plugged honeycomb segment 114A shown in FIG. 18, but is different in the configuration of the one-side circumferential wall cells 122ba and the two-side circumferential wall cells 122bb.

Figure 20:
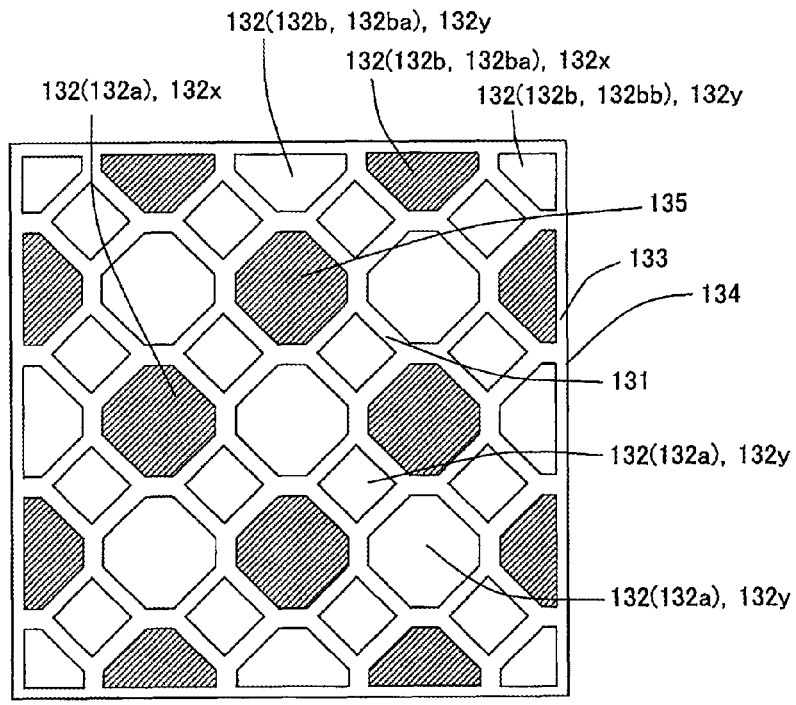
FIG. 20 is a schematic plan view of a plugged honeycomb segment included in the plugged honeycomb structure that is a twelfth embodiment of the present invention viewed from the inflow end face.

The plugged honeycomb structure of the twelfth embodiment includes a plugged honeycomb segment 134A as shown in FIG. 20. The honeycomb segment 134 includes a porous partition wall 131 that defines a plurality of cells 132, and a segment circumferential wall 133 disposed at the outermost circumference. Plugging portions 135 are disposed at the open ends of outflow cells 132x and at open ends of inflow cells 132y of the honeycomb segment 134. Then the plugging portions 135 are disposed at the open ends of the cells 132 so that the inflow cells 132y surround an outflow cell 132x except for the circumferential region of the honeycomb segment 134.

The outflow cells 132x include partition-wall entirely surrounded cells 132a having an octagonal cross-sectional shape, and circumferential-wall partially surrounded cells 132b having a part of the shape of the partition-wall entirely surrounded cell 132a. Then, the circumferential-wall partially surrounded cells 132b of the outflow cells 132x are one-side circumferential wall cells 132ba. The one-side circumferential wall cells 132ba satisfy the condition (1) as stated above. The inflow cells 132y include partition-wall entirely surrounded cells 132a of two types including a quadrangular cross-sectional shape and an octagonal cross-sectional shape, and circumferential-wall partially surrounded cells 132*b* including a part of the partition-wall entirely surrounded cell 132*a* having an octagonal cross-sectional shape. The circumferential-wall partially surrounded cells 132*b* of the inflow cells 132*y* include one-side circumferential wall cells 132*ba* and two-side circumferential wall cells 132*bb*. The one-side circumferential wall cells 132*ba* of the inflow cells 132*y* satisfy the condition (1) as stated above, and the two-side circumferential wall cells 132*bb* satisfy the condition (2B) as stated above.

Figure 21:
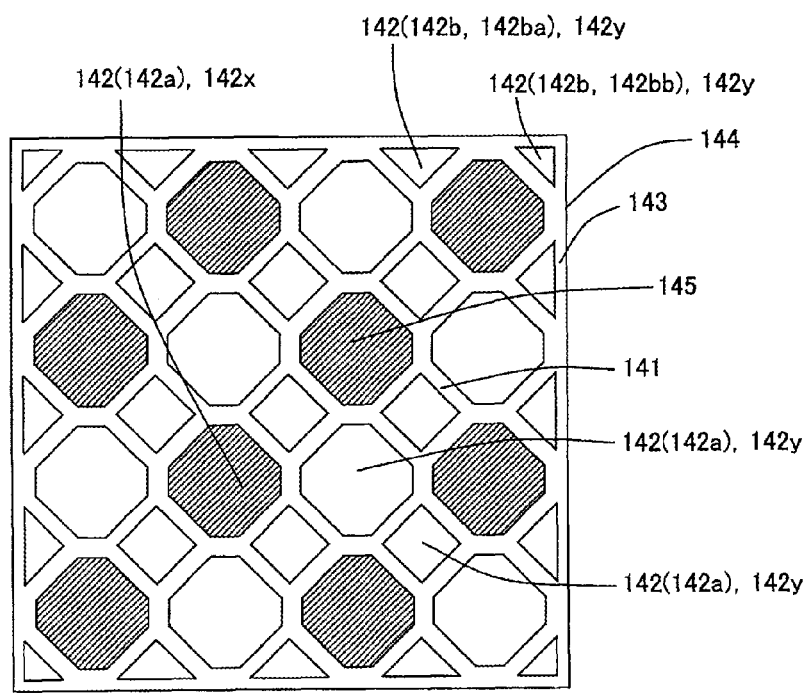
FIG. 21 is a schematic plan view of a plugged honeycomb segment included in the plugged honeycomb structure that is a thirteenth embodiment of the present invention viewed from the inflow end face.

The plugged honeycomb structure of the thirteenth embodiment includes a plugged honeycomb segment 144A as shown in FIG. 21. The honeycomb segment 144 includes a porous partition wall 141 that defines a plurality of cells 142, and a segment circumferential wall 143 disposed at the outermost circumference. Plugging portions 145 are disposed at the open ends of outflow cells 142*x* and at open ends of inflow cells 142*y* of the honeycomb segment 144. Then the plugging portions 145 are disposed at the open ends of the cells 142 so that the inflow cells 142*y* surround an outflow cell 142*x* except for the circumferential region of the honeycomb segment 144.

The outflow cells 142*x* are partition-wall entirely surrounded cells 142*a* having an octagonal cross-sectional shape. The inflow cells 142*y* include partition-wall entirely surrounded cells 142*a* of two types including a quadrangular cross-sectional shape and an octagonal cross-sectional shape, and circumferential-wall partially surrounded cells 142*b* of two types. The circumferential-wall partially surrounded cells 142*b* include one-side circumferential wall cells 142*ba* including a part of the partition-wall entirely surrounded cell 142*a* having a quadrangular cross-sectional shape, and two-side circumferential wall cells 142*bb* including a part of the partition-wall entirely surrounded cell 142*a* having a quadrangular cross-sectional shape. The one-side circumferential wall cells 142*ba* satisfy the condition (1) as stated above, and the two-side circumferential wall cells 142*bb* satisfy the condition (2B) as stated above. The plugged honeycomb segment 144A shown in FIG. 21 has the same repeated sequence pattern as that of the plugged honeycomb segment 134A shown in FIG. 20, but is different in the configuration of the one-side circumferential wall cells 142*ba* and the two-side circumferential wall cells 142*bb*.

(2) Method for Manufacturing Plugged Honeycomb Structure:

There is no particular limitation on the method for manufacturing the plugged honeycomb structure of the present embodiment shown in FIGS. 1 to 5, and this can be manufactured by the following method, for example. Firstly a kneaded material having plasticity is prepared to produce a honeycomb segment. The kneaded material to produce a honeycomb segment can be prepared by adding additives such as binder and water as needed to a material selected as raw material powder from the aforementioned materials suitable for honeycomb segment. For the raw material powder, silicon carbide powder may be used, for example. For the binder, methyl cellulose or hydroxypropoxyl methylcellulose may be used, for example. For the additives, surfactant may be used, for example.

Next, the thus obtained kneaded material is subjected to extrusion, thus producing a prismatic columnar honeycomb formed body, having a partition wall defining a plurality of cells and a segment circumferential wall disposed at the outermost circumference. A plurality of the honeycomb formed bodies are prepared.

The thus obtained honeycomb formed bodies are dried by microwaves and hot air, for example, and then open ends of the cells are plugged with a material similar to the material used for the honeycomb formed bodies, thus producing plugging portions. After producing the plugging portions, the honeycomb formed bodies may be further dried.

Next, each of the honeycomb formed bodies with the plugging portions is fired, thus obtaining a plugged honeycomb segment. The firing temperature and the atmosphere for firing depend on the raw materials used, and a person skilled in the art could select appropriate temperature and atmosphere for firing depending on the selected materials. Next, the plurality of plugged honeycomb segments are bonded mutually using a bonding material, followed by drying and curing, which is then processed at its circumference to have a desired shape, whereby a segment-structured plugged honeycomb structure can be obtained. The bonding material may be prepared by adding solvent such as water to a ceramics material to be in a paste form. Since the cells are exposed in the processed face after the processing of the bonded member of the plugged honeycomb segments at the circumference, a circumference coating material may be applied to the processed face to form the outer wall 8 as shown in FIG. 1. For the circumference coating material, the same material as that of the bonding material can be used.

(3) Plugged Honeycomb Segment:

Next, the following describes the first embodiment of the plugged honeycomb segment of the present invention. The plugged honeycomb segment of the present embodiment is used for the plugged honeycomb structure of the first embodiment as described above.

The plugged honeycomb segment of the present embodiment includes a honeycomb segment 4 and plugging portions 5 as shown in FIGS. 6 and 7. The honeycomb segment 4 includes a porous partition wall 1 that defines a plurality of cells 2 extending from an inflow end face 11 through which fluid flows in to an outflow end face 12 through which the fluid flows out, and a segment circumferential wall 3 disposed at the outermost circumference. The plugging portions 5 are disposed at the open ends of the cells 2 formed in each of the honeycomb segments 4 so as to plug the open ends of the cells 2 on any one of the inflow end face 11 side and the outflow end face 12 side. The plugging portions 5 are disposed so that inflow cells 2*y* surround one outflow cell 2*x* except for at the circumferential region.

The cells 2 formed in the honeycomb segment 4 include partition-wall entirely surrounded cells 2*a* and circumferential-wall partially surrounded cells 2*h*. Then, in the plugged honeycomb structure of the present embodiment, one-side circumferential wall cells 2*ba* of the circumferential-wall partially surrounded cells 2*b* satisfy the condition (1) as stated above, and two-side circumferential wall cells 2*bb* thereof satisfy the condition (2A) or the condition (2B) as stated above. The thus configured plugged honeycomb segment of the present embodiment can be used favorably for the honeycomb segment to produce the plugged honeycomb structure of the first embodiment.

A favorable example of the plugged honeycomb segment of the present embodiment includes a plugged honeycomb segment used for the plugged honeycomb structure of the first embodiment.

Other favorable examples of the plugged honeycomb segment of the present invention include plugged honeycomb segments used for the plugged honeycomb structures according to the second to the thirteenth embodiments shown in FIGS. 9 to 21.

EXAMPLES

Example 1

For a ceramic raw material, silicon carbide (SiC) powder and metallic silicon (Si) powder were mixed at the mass ratio of 80:20 to prepare a mixed raw material. Hydroxypropylmethyl cellulose as binder and water absorbable resin as a pore former were added to this mixed raw material, to which water was further added, thus manufacturing a forming raw material. Then, the obtained forming raw material was kneaded by a kneader, thus preparing a kneaded material.

Next, the obtained kneaded material was formed by a vacuum extruder, whereby sixteen pieces of quadrangular prismatic-columnar honeycomb segments having a repeated sequence pattern similar to the plugged honeycomb segment 34A shown in FIG. 9 were prepared. Herein, the "repeated sequence pattern similar to the plugged honeycomb segment 34A shown in FIG. 9" means a repeated sequence pattern such that eight inflow cells having a pentagonal cross-sectional shape surround an outflow cell having a square cross-sectional shape.

Next, the obtained honeycomb segments were dried by high-frequency induction heating and then dried at 120° C. for 2 hours by a hot-air drier. The drying was performed so that the outflow end faces of the honeycomb segments were directed vertically downward.

Plugging portions were formed at each of the dried honeycomb segments. Firstly, a mask was applied to the inflow end face of the honeycomb segment, and next the masked end part (ends on the inflow end face side) was immersed in slurry for plugging to fill open ends of the cells without the mask (outflow cells) with the slurry for plugging. In this way, plugging portions were formed at the honeycomb segment on the inflow end face side. Then, plugging portions were formed at the inflow cells as well similarly at the outflow end face of the dried honeycomb segment.

Then the honeycomb segment including the plugging portions was subjected to degreasing and firing, whereby a plugged honeycomb segment was obtained. The degreasing was performed at 550° C. for 3 hours, and the firing was performed at 1,450° C. for 2 hours in an argon atmosphere. The firing was performed so that the outflow end faces of the honeycomb segments with plugging portions were directed vertically downward.

The outflow cells of the produced plugged honeycomb segment had partition-wall entirely surrounded cells (square) having a square cross-sectional shape and circumferential-wall partially surrounded cell including at least a part of the shape of the partition-wall entirely surrounded cell similarly to the plugged honeycomb segment shown in FIG. 9. Then, the circumferential-wall partially surrounded cells of the outflow cells further included one-side circumferential wall cells (rectangular cross-sectional shape) and two-side circumferential wall cells (square cross-sectional shape). The inflow cells included partition-wall entirely surrounded cells having a pentagonal cross-sectional shape and circumferential-wall partially surrounded full cells having the same cross-sectional shape as that of this partition-wall entirely surrounded cell. The design of the plugged honeycomb segment in which the inflow cells and the outflow cells are configured as stated above is called "design A". Table 1 shows the design of the plugged honeycomb segment used for Example 1 at the field of "design".

In the produced plugged honeycomb segment, a cross section orthogonal to the axial direction was square in shape, and the length of one side of the square (segment size) was 36.2 mm. The honeycomb segment had the length in the axial direction of 152.4 mm. Then in the plugged honeycomb segment, the distance P shown in FIG. 9 was 2.0 mm, the distance Q was 1.2 mm, and the thickness of the partition wall was 0.32 mm. Table 1 shows the values of "segment size (one side) [mm]", "thickness of partition wall [mm]", "distance P [mm]", and "distance Q [mm]".

In the produced plugged honeycomb segment, the area of open end of the one-side circumferential wall cells of the outflow cells was 50% of the area of open end of the partition-wall entirely surrounded cells including the shape of the one-side circumferential wall cell. Hereinafter the ratio of the area of open end of the one-side circumferential wall cells to the area of open end of the partition-wall entirely surrounded cells including the shape of the one-side circumferential wall cell is called a "ratio of the open end area of one-side circumferential wall cell". The area of open end of the two-side circumferential wall cells of the outflow cells was 25% of the area of open end of the partition-wall entirely surrounded cells including the shape of the two-side circumferential wall cell. Hereinafter the ratio of the area of open end of the two-side circumferential wall cells to the area of open end of the partition-wall entirely surrounded cells including the shape of the two-side circumferential wall cell is called a "ratio of the open end area of two-side circumferential wall cell". Table 1 shows the "ratio of the open end area of one-side circumferential wall cell" and the "ratio of the open end area of two-side circumferential wall cell". The produced plugged honeycomb segment had the thickness of the segment circumferential wall that was 0.5 mm. Table 1 shows the thickness of the segment circumferential wall at the field of "segment circumferential wall thickness [mm]".

The sixteen pieces of plugged honeycomb segments after firing were bonded with a bonding material (ceramic cement) for integration. The bonding material contained inorganic particles and inorganic adhesive as main components and organic binder, surfactant, foamable resin, water and the like as accessory components. The inorganic particles used were plate-like particles, and the inorganic adhesive used was colloidal silica (silica sol). The plate-like particles used were mica. The circumference of the honeycomb-segment bonded member including the sixteen pieces of honeycomb segments bonded for integration was ground to be a round pillar shape, and a coating material was applied to the circumferential face thereof, thus obtaining the plugged honeycomb structure of Example 1. The plugged honeycomb structure of Example 1 had the diameter at the end face of 143.8 mm. The coating material contained ceramic powder, water and binder. The width of the bonding layer formed with the bonding material was 1 mm. Table 1 shows the width of the bonding layer at the field of "bonding width [mm]"

TABLE 1

| | Design | Segment size (one side) [mm] | Partition wall thickness [mm] | P [mm] | Q [mm] | Ratio of open end area of one-side circumferential wall cell | Ratio of open end area of two-side circumferential wall cell | Bonding width [mm] | Segment circumferential wall thickness [mm] |
|---|---|---|---|---|---|---|---|---|---|
| Comp. Ex. 1 | monolith | — | 0.32 | 2.0 | 1.2 | — | — | — | — |
| Ex. 1 | design A | 36.2 | 0.32 | 2.0 | 1.2 | 50% | 25% | 1 | 0.5 |
| Ex. 2 | design A | 36.2 | 0.32 | 2.0 | 1.2 | 50% | 25% | 1.5 | 0.5 |
| Ex. 3 | design A | 36.2 | 0.32 | 2.0 | 1.2 | 50% | 25% | 1.6 | 0.5 |
| Ex. 4 | design A | 36.2 | 0.32 | 2.0 | 1.2 | 50% | 25% | 0.5 | 0.5 |
| Ex. 5 | design A | 36.2 | 0.32 | 2.0 | 1.2 | 50% | 25% | 0.4 | 0.5 |
| Ex. 6 | design A | 37.2 | 0.32 | 2.0 | 1.2 | 50% | 25% | 1 | 1 |
| Ex. 7 | design A | 37.4 | 0.32 | 2.0 | 1.2 | 50% | 25% | 1 | 1.1 |
| Ex. 8 | design A | 35.8 | 0.32 | 2.0 | 1.2 | 50% | 25% | 1 | 0.3 |
| Ex. 9 | design A | 35.6 | 0.32 | 2.0 | 1.2 | 50% | 25% | 1 | 0.2 |
| Comp. Ex. 2 | design A | 36.0 | 0.32 | 2.0 | 1.2 | 44% | 19% | 1 | 0.5 |
| Comp. Ex. 3 | design A | 36.4 | 0.32 | 2.0 | 1.2 | 56% | 31% | 1 | 0.5 |
| Ex. 10 | design B | 36.2 | 0.32 | 2.0 | 1.2 | 50% | — | 1 | 0.5 |
| Ex. 11 | design C | 37.2 | 0.32 | 2.0 | 1.2 | 50% | — | 1 | 0.5 |
| Ex. 12 | design D | 37.7 | 0.31 | 1.7 | 1.4 | 50% | 25% | 1 | 0.5 |
| Comp. Ex. 4 | design D | 37.5 | 0.31 | 1.7 | 1.4 | 44% | 19% | 1 | 0.5 |
| Comp. Ex. 5 | design D | 37.9 | 0.31 | 1.7 | 1.4 | 56% | 31% | 1 | 0.5 |

Comparative Example 1

In Comparative Example 1, a round pillar-shaped honeycomb formed body of 143.8 mm in diameter at the end face was produced using a kneaded material prepared similarly to the kneaded material used for the production of the honeycomb segments of Example 1. Then, plugging portions were formed at the open ends of the cells of the honeycomb formed body by a method similar to that of Example 1, and the honeycomb formed body with the plugging portions was fired by a method similar to that of Example 1, whereby a plugged honeycomb structure of Comparative Example 1 was produced.

The plugged honeycomb structure of Comparative Example 1 did not have a segment structure, and included a monolithic honeycomb structure and the plugging portions. The design of the plugged honeycomb structure including such a monolithic honeycomb structure is called "monolith". The honeycomb structure making up the plugged honeycomb structure of Comparative Example 1 had a "repeated sequence pattern" in which eight inflow cells having a pentagonal cross-sectional shape surround an outflow cell having a square cross-sectional shape. Table 1 shows the design of the plugged honeycomb structure, the thickness of partition wall, the distance P and the distance Q of Comparative Example 1.

Examples 2 to 9 and Comparative Examples 2 to 5

The plugged honeycomb structures of Examples 2 to 9 and Comparative Examples 2 to 5 were produced similarly to Example 1 other than that the shape of the honeycomb segments and the bonding width were changed as in Table 1. The shape of the honeycomb segments was changed as in Table 1 for the segment size, the thickness of partition wall, the distance P, the distance Q, the ratio of the open end area of one-side circumferential wall cell, the ratio of the open end area of two-side circumferential wall cell, and the segment circumferential wall thickness.

Example 10

The plugged honeycomb segment of Example 10 was produced similarly to Example 1 other than that the design of the plugged honeycomb segment was changed to a design as in the plugged honeycomb segment 4A shown in FIG. 7. In the plugged honeycomb structure of Example 10, the outflow cells were partition-wall entirely surrounded cells (square) having a square cross-sectional shape only. The inflow cells included partition-wall entirely surrounded cells having a pentagonal cross-sectional shape and one-side circumferential wall cells including at least a part of the shape of the partition-wall entirely surrounded cells. The design of the plugged honeycomb segment used for Example 10 is called "design B". For the plugged honeycomb structure of Example 10, Table 1 shows the segment size, the thickness of partition wall, the distance P, the distance Q, the ratio of the open end area of one-side circumferential wall cell, the ratio of the open end area of two-side circumferential wall cell, the bonding width, and the segment circumferential wall thickness.

Example 11

The plugged honeycomb segment of Example 11 was produced similarly to Example 1 other than that the design of the plugged honeycomb segment was changed to a design as in the plugged honeycomb segment 94A shown in FIG. 16. In the plugged honeycomb structure of Example 11, the outflow cells included partition-wall entirely surrounded cells (square) having a square cross-sectional shape and one-side circumferential wall cells (triangle) including at least a part of the shape of the partition-wall entirely surrounded cells. The inflow cells included partition-wall entirely surrounded cells having a pentagonal cross-sectional shape and circumferential-wall partially surrounded full cells having the same shape as that of the partition-wall entirely surrounded cells. The design of the plugged honeycomb segment used for Example 11 is called "design C". For the plugged honeycomb structure of Example 11, Table 1 shows the segment size, the thickness of partition wall, the distance P, the distance Q, the ratio of the open end area of one-side circumferential wall cell, the ratio of the open end area of two-side circumferential wall cell, the bonding width, and the segment circumferential wall thickness.

Example 12

The plugged honeycomb segment of Example 12 was produced similarly to Example 1 other than that the design of the plugged honeycomb segment was changed to a design as in the plugged honeycomb segment 114A shown in FIG. 18. In the plugged honeycomb structure of Example 12, the outflow cells included partition-wall entirely surrounded cells having an octagonal cross-sectional shape and one-side circumferential wall cells (the shape obtained by dividing an octagon into half) including at least a part of the shape of the partition-wall entirely surrounded cells. The inflow cells included partition-wall entirely surrounded cells of two types including a quadrangular cross-sectional shape and an octagonal cross-sectional shape, and one-side circumferential wall cells (rectangle obtained by dividing a quadrangle into half) including a part of the quadrangular partition-wall entirely surrounded cells. The design of the plugged honeycomb segment used for Example 12 is called "design D". For the plugged honeycomb structure of Example 12, Table 1 shows the segment size, the thickness of partition wall, the distance P, the distance Q, the ratio of the open end area of one-side circumferential wall cell, the ratio of the open end area of two-side circumferential wall cell, the bonding width, and the segment circumferential wall thickness.

The plugged honeycomb structures of Examples 1 to 12 and Comparative Examples 1 to 5 were evaluated for pressure loss, isostatic strength and thermal shock resistance by the following methods. Table 2 shows the evaluation results.

TABLE 2

|  | Pressure loss | Isostatic strength | Thermal shock resistance |
| --- | --- | --- | --- |
| Comp. Ex. 1 | reference | A | D |
| Ex. 1 | B | B | B |
| Ex. 2 | B | B | A |
| Ex. 3 | C | B | A |
| Ex. 4 | A | B | B |
| Ex. 5 | A | B | C |
| Ex. 6 | B | A | C |
| Ex. 7 | C | A | C |
| Ex. 8 | B | B | B |
| Ex. 9 | B | C | B |
| Comp. Ex. 2 | D | B | B |
| Comp. Ex. 3 | D | B | B |
| Ex. 10 | B | B | B |
| Ex. 11 | B | B | B |
| Ex. 12 | B | B | B |
| Comp. Ex. 4 | D | B | B |
| Comp. Ex. 5 | D | B | B |

(Pressure Loss)

Firstly, the plugged honeycomb structure of Comparative Example 1 was attached to an exhaust system of an automobile including a diesel engine for automobile with displacement of 2.0 L. Using this automobile, the pressure loss during full-load step-up was measured in the vehicle testing by a chassis dynamometer. Specifically, the engine revolutions were increased by 1,000 rpm for every 3 minutes/step to 5,000 rpm, and the pressure loss at each step was measured. The pressure loss of the plugged honeycomb structure of Comparative Example 1 was set as the reference for pressure loss evaluation. Next, the pressure loss of the plugged honeycomb structures of Examples 1 to 12 and Comparative Examples 2 to 5 was measured by a method similar to Comparative Example 1. The values of pressure loss of these Examples and Comparative Examples were compared with the value of pressure loss of Comparative Example 1 as the reference, and the pressure loss was evaluated based on the following evaluation criteria. For the evaluation, the pressure loss at the engine revolutions of 5,000 rpm was used.

Evaluation A: an increase in pressure loss from the reference was 5% or less of the reference.

Evaluation B: an increase in pressure loss from the reference exceeded 5% of the reference and was 10% or less.

Evaluation C: an increase in pressure loss from the reference exceeded 10% of the reference and was 15% or less.

Evaluation D: an increase in pressure loss from the reference exceeded 15%.

(Isostatic Strength)

Isostatic strength was measured in accordance with the isostatic fracture strength testing specified at M505-87 of the Japanese Automotive Standards Organization (JASO) that is a specification issued by the Society of Automotive Engineers of Japan. Isostatic fracture strength is tested by placing a plugged honeycomb structure in a rubber-made tubular container, which is sealed with an aluminum plate, and applying an isostatic pressure thereto in water. That is, the isostatic fracture strength testing is to simulate the compression load of the plugged honeycomb structure when it is accommodated in a casing with the circumferential face held by the casing. Isostatic strength measured by this isostatic fracture strength testing is indicated as a pressure (MPa) applied when the plugged honeycomb structure breaks down. The isostatic strength was evaluated based on the following evaluation criteria.

Evaluation A: isostatic strength was 3.0 MPa or more.

Evaluation B: isostatic strength was 2.0 MPa or more and less than 3.0 MP.

Evaluation C: isostatic strength was 1.0 MPa or more and less than 2.0 MP.

Evaluation D: isostatic strength was less than 1.0 MP.

(Thermal Shock Resistance)

Thermal shock resistance was evaluated by electric furnace spalling testing in accordance with the method specified at M505-87 of the Japanese Automotive Standards Organization (JASO) that is a specification issued by the Society of Automotive Engineers of Japan. Specifically a plugged honeycomb structure at a room temperature was firstly placed in an electric furnace that was held at a temperature higher than the room temperature by predetermined temperature. After keeping this state for 20 minutes, the plugged honeycomb structure was taken out, and was placed on a firebrick. After letting this stand in this state for 15 minutes or more, the plugged honeycomb structure was cooled to be a room temperature, and then the plugged honeycomb structure was examined about a fracture such as cracks. This operation was repeated until the plugged honeycomb structure generated a fracture such as cracks. The temperature in the electric furnace was increased by 25° C. every time when the above operation was repeated. The temperature in the electric furnace during the operation once before the operation in which a fracture such as cracks was found in the plugged honeycomb structure was set at the safety temperature of the plugged honeycomb structure. Thermal shock resistance was evaluated based on the following evaluation criteria.

Evaluation A: safety temperature was 500° C. or more.

Evaluation B: safety temperature was 400° C. or more and less than 500° C.

Evaluation C: safety temperature was 300° C. or more and less than 400° C.

Evaluation D: safety temperature was less than 300° C.

(Results)

The plugged honeycomb structures of Examples 1 to 12 had Evaluation C or better for all of the evaluations of the pressure loss, the isostatic strength and the thermal shock resistance, and showed good evaluation results. On the contrary, the plugged honeycomb structures of Comparative Examples 1 to 5 had Evaluation D for any one of the evaluations of the pressure loss, the isostatic strength and the thermal shock resistance, which may not be suitable for the DPF purpose to be installed in an internal combustion engine of an automobile or the like.

The plugged honeycomb structure of the present invention can be used as a trapping filter to remove particulates or the like included in exhaust gas emitted from a direct injection type gasoline engine, a diesel engine and the like. The plugged honeycomb segment of the present invention can be used to produce the plugged honeycomb structure of the present invention.

DESCRIPTION OF REFERENCE NUMERALS 1, 31, 41, 51, 61, 71, 81, 91, 101, 111, 121, 131, 141: partition wall
2, 32, 42, 52, 62, 72, 82, 92, 102, 112, 122, 132, 142: cell
2a, 32a, 42a, 52a, 62a, 72a, 82a, 92a, 102a, 112a, 122a, 132a, 142a: partition-wall entirely surrounded cell
2b, 32b, 42b, 52b, 62b, 72b, 82b, 92b, 102b, 112b, 122b, 132b, 142b: circumferential-wall partially surrounded cell
2ba, 32ba, 42ba, 52ba, 62ba, 72ba, 82ba, 92ba, 102ba, 112ba, 122ba, 132ba, 142ba: one-side circumferential wall cell
32bb, 72bb, 82bb, 112bb, 122bb, 132bb, 142bb: two-side circumferential wall cell
32c, 72c, 82c, 92c, 102c: circumferential-wall partially surrounded full cell
2x, 32x, 42x, 52x, 62x, 72x, 82x, 92x, 102x, 112x, 122x, 132x, 142x: outflow cell (predetermined cell)
2y, 32y, 42y, 52y, 62y, 72y, 82y, 92y, 102y, 112y, 122y, 132y, 142y: inflow cell (residual cell)
3, 33, 43, 53, 63, 73, 83, 93, 103, 113, 123, 133, 143: segment circumferential wall
4, 34, 44, 54, 64, 74, 84, 94, 104, 114, 124, 134, 144: honeycomb segment
4A, 34A, 44A, 54A, 64A, 74A, 84A, 94A, 104A, 114A, 124A, 134A, 144A: plugged honeycomb segment
5, 35, 45, 55, 65, 75, 85, 95, 105, 115, 125, 135, 145: plugging portion
6: bonding layer
7: honeycomb-segment bonded member
8: outer wall
11: inflow end face
12: outflow end face
13: first side
14: second side
15: third side
16: fourth side
P, Q: distance

What is claimed is:

1. A plugged honeycomb structure comprising:
a plurality of prismatic-columnar shaped honeycomb segments, each having a porous partition wall that defines a plurality of cells extending from an inflow end face through which fluid flows in, to an outflow end face through which the fluid flows out, and each having a segment circumferential wall disposed at outermost circumference thereof;
a bonding layer bonding lateral faces of the plurality of honeycomb segments each other; and
plugging portions disposed at open ends of predetermined cells at the inflow end face of each of the plurality of honeycomb segments and at open ends of residual cells at the outflow end face of each of the plurality of honeycomb segments, wherein
each of the plurality of honeycomb segments is configured so that the plurality of cells thereof having at least two types of different shapes have a predetermined repeated sequence pattern in a cross section orthogonal to an extending direction of the plurality of cells thereof,
the plurality of cells of each of the plurality of honeycomb segments include a partition-wall entirely surrounded cell, wherein the partition wall is disposed so as to surround the partition-wall entirely surrounded cell,
the plurality of cells of each of the plurality of honeycomb segments include a circumferential-wall partially surrounded cell, wherein a shape of the circumferential-wall partially surrounded cell in the cross section orthogonal to the extending direction of the plurality of cells includes at least a part of the shape of the partition-wall entirely surrounded cell, the partition wall and the segment circumferential wall are disposed so as to surround the circumferential-wall partially surrounded cell, and the circumferential-wall partially surrounded cell has an area of open end that is smaller than an area of open end of the partition-wall entirely surrounded cell including the shape of the circumferential-wall partially surrounded cell,
a one-side circumferential wall cell, that is defined as the circumferential-wall partially surrounded cell in which one side of a shape of the one-side circumferential wall cell in the cross section is made up of the segment circumferential wall, has an area of open end that is 45 to 55% of an area of open end of the partition-wall entirely surrounded cell including the shape of the one-side circumferential wall cell,
a two-side circumferential wall cell, that is defined as the circumferential-wall partially surrounded cell in which two sides of a shape of the two-side circumferential wall cell in the cross section are made up of the segment circumferential wall, does not exist in each of the plurality of honeycomb segments or has an area of open end that is 20 to 30% of an area of open end of the partition-wall entirely surrounded cell including the shape of the two-side circumferential wall cell, and
the repeated sequence pattern of the plurality of cells of each of the plurality of honeycomb segments is kept at a boundary between two of the plurality of honeycomb segments bonded each other with the bonding layer at the inflow end face and the outflow end face.

2. The plugged honeycomb structure according to claim 1, wherein the plugging portions are disposed at open ends of the plurality of cells of each of the plurality of honeycomb segments so that inflow cells in which the plugging portions are disposed at open ends of the plurality of cells at the outflow end face, surround one of outflow cells in which the plugging portions are disposed at open ends of the plurality of cells at the inflow end face, except for at a circumferential region of each of the plurality of honeycomb segments.

3. The plugged honeycomb structure according to claim 1, wherein the segment circumferential wall of each of the plurality of honeycomb segments has a thickness of 0.3 to 1.0 mm.

4. The plugged honeycomb structure according to claim 2, wherein the segment circumferential wall of each of the plurality of honeycomb segments has a thickness of 0.3 to 1.0 mm.

5. The plugged honeycomb structure according to claim 1, wherein the bonding layer has a thickness of 0.5 to 1.5 mm.

6. The plugged honeycomb structure according to claim 4, wherein the bonding layer has a thickness of 0.5 to 1.5 mm.

7. The plugged honeycomb structure according to claim 1, wherein the partition-wall entirely surrounded cell includes two types or more of cells that are different in shape in the cross section.

8. The plugged honeycomb structure according to claim 6, wherein the partition-wall entirely surrounded cell includes two types or more of cells that are different in shape in the cross section.

9. A plugged honeycomb segment, comprising:
a prismatic-columnar shaped honeycomb segment, having a porous partition wall that defines a plurality of cells extending from an inflow end face through which fluid flows in, to an outflow end face through which the fluid flows out, and having a segment circumferential wall disposed at outermost circumference thereof; and
plugging portions disposed at open ends of predetermined cells at the inflow end face of the honeycomb segment and at open ends of residual cells at the outflow end face of the honeycomb segment, wherein
the honeycomb segment is configured so that the plurality of cells thereof having at least two types of different shapes have a predetermined repeated sequence pattern in a cross section orthogonal to an extending direction of the plurality of cells thereof,
the plurality of cells of the honeycomb segment include a partition-wall entirely surrounded cell, wherein the partition wall is disposed so as to surround the partition-wall entirely surrounded cell,
the plurality of cells of the honeycomb segment include a circumferential-wall partially surrounded cell, wherein a shape of the circumferential-wall partially surrounded cell in the cross section orthogonal to the extending direction of the plurality of cells includes at least a part of the shape of the partition-wall entirely surrounded cell, the partition wall and the segment circumferential wall are disposed so as to surround the circumferential-wall partially surrounded cell, and the circumferential-wall partially surrounded cell has an area of open end that is smaller than an area of open end of the partition-wall entirely surrounded cell including the shape of the circumferential-wall partially surrounded cell,
a one-side circumferential wall cell, that is defined as the circumferential-wall partially surrounded cell in which one side of a shape of the one-side circumferential wall cell in the cross section is made up of the segment circumferential wall, has an area of open end that is 45 to 55% of an area of open end of the partition-wall entirely surrounded cell including the shape of the one-side circumferential wall cell, and
a two-side circumferential wall cell, that is defined as the circumferential-wall partially surrounded cell in which two sides of a shape of the two-side circumferential wall cell in the cross section are made up of the segment circumferential wall, does not exist in the honeycomb segment or has an area of open end that is 20 to 30% of an area of open end of the partition-wall entirely surrounded cell including the shape of the two-side circumferential wall cell.

10. The plugged honeycomb structure according to claim 9, wherein the plugging portions are disposed at open ends of the plurality of cells of the honeycomb segment so that inflow cells in which the plugging portions are disposed at open ends of the plurality of cells at the outflow end face, surround one of outflow cells in which the plugging portions are disposed at open ends of the plurality of cells at the inflow end face, except for at a circumferential region of the honeycomb segment.

11. The plugged honeycomb structure according to claim 9, wherein the segment circumferential wall of the honeycomb segment has a thickness of 0.3 to 1.0 mm.

12. The plugged honeycomb structure according to claim 10, wherein the segment circumferential wall of the honeycomb segment has a thickness of 0.3 to 1.0 mm.

13. The plugged honeycomb structure according to claim 9, wherein the partition-wall entirely surrounded cell includes two types or more of cells that are different in shape in the cross section.

14. The plugged honeycomb structure according to claim 12, wherein the partition-wall entirely surrounded cell includes two types or more of cells that are different in shape in the cross section.

* * * * *